(12) United States Patent
de Oliveira Antunes et al.

(10) Patent No.: US 11,148,335 B2
(45) Date of Patent: *Oct. 19, 2021

(54) INJECTION MOLDING FLOW CONTROL APPARATUS AND METHOD

(71) Applicant: Synventive Molding Solutions, Inc., Peabody, MA (US)

(72) Inventors: Sergio Ribeiro de Oliveira Antunes, Amesbury, MA (US); Christian Gotz, Bensheim (DE); Juergen Wilhelm Emich, Gross Zimmern (DE)

(73) Assignee: Synventive Molding Solutions, Inc., Peabody, MA (US)

(*) Notice: Subject to any disclaimer, the term of this patent is extended or adjusted under 35 U.S.C. 154(b) by 302 days.

This patent is subject to a terminal disclaimer.

(21) Appl. No.: 16/199,357

(22) Filed: Nov. 26, 2018

(65) Prior Publication Data

US 2019/0091910 A1   Mar. 28, 2019

Related U.S. Application Data

(60) Continuation of application No. 15/480,447, filed on Apr. 6, 2017, now Pat. No. 10,173,356, which is a (Continued)

(51) Int. Cl.
*B29C 45/28* (2006.01)
*B29C 45/77* (2006.01)
(Continued)

(52) U.S. Cl.
CPC .............. *B29C 45/77* (2013.01); *B29C 45/03* (2013.01); *B29C 45/2703* (2013.01);
(Continued)

(58) Field of Classification Search
CPC .......... B29C 45/281; B29C 2045/2865; B29C 2045/2872
See application file for complete search history.

(56) References Cited

U.S. PATENT DOCUMENTS 3,820,928 A   6/1974   Lehl
4,057,382 A   11/1977  Yamamori
(Continued)

FOREIGN PATENT DOCUMENTS

CN   103249538 A   8/2013
CN   104526975 A   4/2015
(Continued)

OTHER PUBLICATIONS

Application to Ministry of Universities and Scientific and Technological Research for financial support from the "Fondo Agevolazioni per la Ricerca (FAR)" (fund for the promotion of research) filed by INCOS S.p. A, on Jul. 18, 2003 (now INglass S.p.A.).

(Continued)

*Primary Examiner* — James Sanders
(74) *Attorney, Agent, or Firm* — Polsinelli, P.C.

(57) ABSTRACT

An apparatus for controlling the rate of flow of a fluid mold material comprising:
a manifold,
an actuator interconnected to a valve pin,
a position sensor that senses position of the valve pin,
a controller that controls movement of the actuator according to instructions that instruct the actuator to drive the valve pin upstream at one or more selected intermediate velocities in response to receipt by the controller of a signal from the position sensor that the valve pin is disposed in the one or more intermediate upstream gate open positions.

76 Claims, 13 Drawing Sheets

Related U.S. Application Data continuation of application No. 14/567,369, filed on Dec. 11, 2014, now Pat. No. 9,636,858, which is a division of application No. 13/484,336, filed on May 31, 2012, now Pat. No. 9,011,736, which is a continuation of application No. PCT/US2011/062099, filed on Nov. 23, 2011.

(60) Provisional application No. 61/475,340, filed on Apr. 14, 2011, provisional application No. 61/416,583, filed on Nov. 23, 2010.

(51) Int. Cl.

| | | |
|---|---|---|
| *B29C 45/76* | (2006.01) | |
| *G05B 15/02* | (2006.01) | |
| *G05D 7/06* | (2006.01) | |
| *B29C 45/27* | (2006.01) | |
| *B29C 45/80* | (2006.01) | |
| *B29C 45/03* | (2006.01) | |
| *B29C 45/17* | (2006.01) | |
| *B29K 105/00* | (2006.01) | |

(52) U.S. Cl.
CPC ........ *B29C 45/2708* (2013.01); *B29C 45/281* (2013.01); *B29C 45/2806* (2013.01); *B29C 45/76* (2013.01); *B29C 45/7613* (2013.01); *B29C 45/80* (2013.01); *G05B 15/02* (2013.01); *G05D 7/0635* (2013.01); *B29C 2045/1792* (2013.01); *B29C 2045/2712* (2013.01); *B29C 2045/2824* (2013.01); *B29C 2045/2865* (2013.01); *B29C 2045/2872* (2013.01); *B29C 2945/76006* (2013.01); *B29C 2945/7628* (2013.01); *B29C 2945/76076* (2013.01); *B29C 2945/76083* (2013.01); *B29C 2945/76277* (2013.01); *B29C 2945/76381* (2013.01); *B29C 2945/76545* (2013.01); *B29C 2945/76568* (2013.01); *B29C 2945/76598* (2013.01); *B29C 2945/76755* (2013.01); *B29C 2945/76859* (2013.01); *B29C 2945/76933* (2013.01); *B29C 2945/76936* (2013.01); *B29C 2945/76939* (2013.01); *B29C 2945/76993* (2013.01); *B29K 2105/0067* (2013.01)

(56) References Cited

U.S. PATENT DOCUMENTS

| | | | |
|---|---|---|---|
| 5,356,576 A | 10/1994 | Fischbach | |
| 5,464,909 A | 11/1995 | Chang et al. | |
| 5,523,045 A | 6/1996 | Kudert et al. | |
| 5,556,582 A | 9/1996 | Kazmer | |
| 6,228,309 B1 | 5/2001 | Jones et al. | |
| 6,294,122 B1 | 9/2001 | Moss et al. | |
| 7,029,268 B2 | 4/2006 | Doyle | |
| 7,121,820 B2 | 10/2006 | Tooman et al. | |
| 7,588,436 B2 | 9/2009 | Tooman | |
| 9,005,509 B2 | 4/2015 | Galati et al. | |
| 9,011,736 B2 | 4/2015 | de Oliveira Antunes et al. | |
| 9,498,909 B2 | 11/2016 | Moss et al. | |
| 9,623,598 B2 | 4/2017 | Galati et al. | |
| 2001/0045688 A1 | 11/2001 | Royer | |
| 2004/0150125 A1 | 8/2004 | Huard | |
| 2004/0262792 A1 | 12/2004 | Huard et al. | |
| 2007/0224303 A1 | 9/2007 | Vasapoli et al. | |
| 2008/0014296 A1 | 1/2008 | Tooman et al. | |
| 2009/0291160 A1 | 11/2009 | Tooman et al. | |
| 2010/0225025 A1 | 9/2010 | Striegel | |
| 2017/0151703 A1 | 6/2017 | de Oliveira Antunes et al. | |

FOREIGN PATENT DOCUMENTS

| | | |
|---|---|---|
| DE | 19857735 A1 | 6/2000 |
| DE | 102009012082 B3 | 10/2010 |
| DE | 10 2010 008 610 A1 | 8/2011 |
| DE | 102010008510 A1 | 8/2011 |
| EP | 0269091 A2 | 1/1988 |
| EP | 0125787 B1 | 8/1991 |
| EP | 2360003 A1 | 8/2011 |
| EP | 1810812 B1 | 2/2013 |
| EP | 2504145 B1 | 6/2013 |
| EP | 2604408 B1 | 3/2014 |
| EP | 2427318 B1 | 7/2014 |
| EP | 2620266 B1 | 3/2015 |
| EP | 2679374 B1 | 9/2016 |
| EP | 3195998 A1 | 7/2017 |
| JP | H6-064002 A | 3/1994 |
| JP | 06064002 | 8/1994 |
| JP | H07241879 A | 9/1995 |
| JP | 2002292683 A | 10/2002 |
| JP | 2009190386 A | 8/2009 |
| JP | 2012035428 A | 2/2012 |
| WO | 2002066224 A1 | 8/2002 |
| WO | 2012074879 A1 | 6/2012 |
| WO | 2012087491 A1 | 6/2012 |

OTHER PUBLICATIONS

Ministry's refusal of the subsidy to INCOS S.p.A. (now INglass S.p.A.) issued Dec. 16, 2003.
Ministry grant letter May 25, 2014.
Loan Agreement between INCOS S.p.A. And Interbanca S.p.A. summer 2007.
Extract from register of the Chamber of Commerce, Industry, Handicrafts and Agriculture re: S.A. Tech s.r.l.
Email correspondence between Marco Salvador and Dario Girelli (owner of S.A. Tech s.r.l.) re: meeting in Nov. 2017.
Email re: outcome of Nov. 28, 2017 meeting between Marco Salvador and Dario Girelli.
Product Data Sheet of Stepnet Panel control system from 2006 (in German).
Feb. 29, 2008 email and invoice from software company.
Test report of Apr. 10, 2008 by Marco Salvador concerning the first version of the software.
Apr. 14, 2008 summary of Dario Girelli and Marco Salvador re: the main features and applications for the newly developed software.
Jun. 16, 2008 offer from S.A. Tech s.r.l.
Jun. 30, 2008 acceptance of offer.
Email re: further development of software program.
Jul. 22, 2008 Offer from S.A. Tech s.r.l. re: PowerPoint "080722 specifiche tecniche (Satech).ppt".
Oct. 29, 2008 test report.
Jan. 22, 2009 final report to financing bank.
Chronological extract from the commercial register of Hella KGaA Hueck & Co.
Oct. 26, 2007 offer to Hella.
Jul. 4, 2008 PowerPoint presentation.
Aug. 18, 2008 invoice to Hella.
Nullity Complaint with exhibits and translation of complaint.
Figure 1 of JP H6-064002.
Infringer's Reply to EP'266 with translation.
Answer of Infringer to German Complaint translated into English.
English machine translation of JPH6-064002; Aug. 9, 2019.
English machine translation of DE 10 2010 008 610; retreived from www.epspacenet.com on Jan. 20, 2020.
International Search Report and Written Opinion dated Apr. 13, 2012 in Int'l. Application No. PCT/US2011/062096.
International Search Report and Written Opinion dated Mar. 29, 2012 in Int'l. Application No. PCT/US2011/062099.
Communication under Rule 71(3) EPC dated Nov. 21, 2013 in European Patent Application No. 1357036.8.
Declaration Submitted by Infringer in Litigation in Europe Found Liable for Infringement of German counterpart patent to a parent application of the present application (see accompanying transmittal for additional information).

(56) References Cited

OTHER PUBLICATIONS

Dec. 19, 2018 letter from Regimbeau Creative IP to M. Lawrence Oliverio re: Synventive Molding Solutions, Inc. Patents.
Judicial Clarification Pursuant to Section 83, paragraph 1 German Patent Act, Oral Hearing Apr. 20, 2021 with English Language Translation.
German Definition of Servomotor; Wikipedia: https://de.wikipedia org/w/index.php?title=Servomotor&oldid=79998892; Aug. 2, 2019.
Selection from German Spritzgieβ-technik (Injection Molding Technology) by Sieyfiied Stitz and Walter Keller.
English Translation of Nullity Complaint against German Patent No. 60 2011 014 509.6, Aug. 31, 2020.

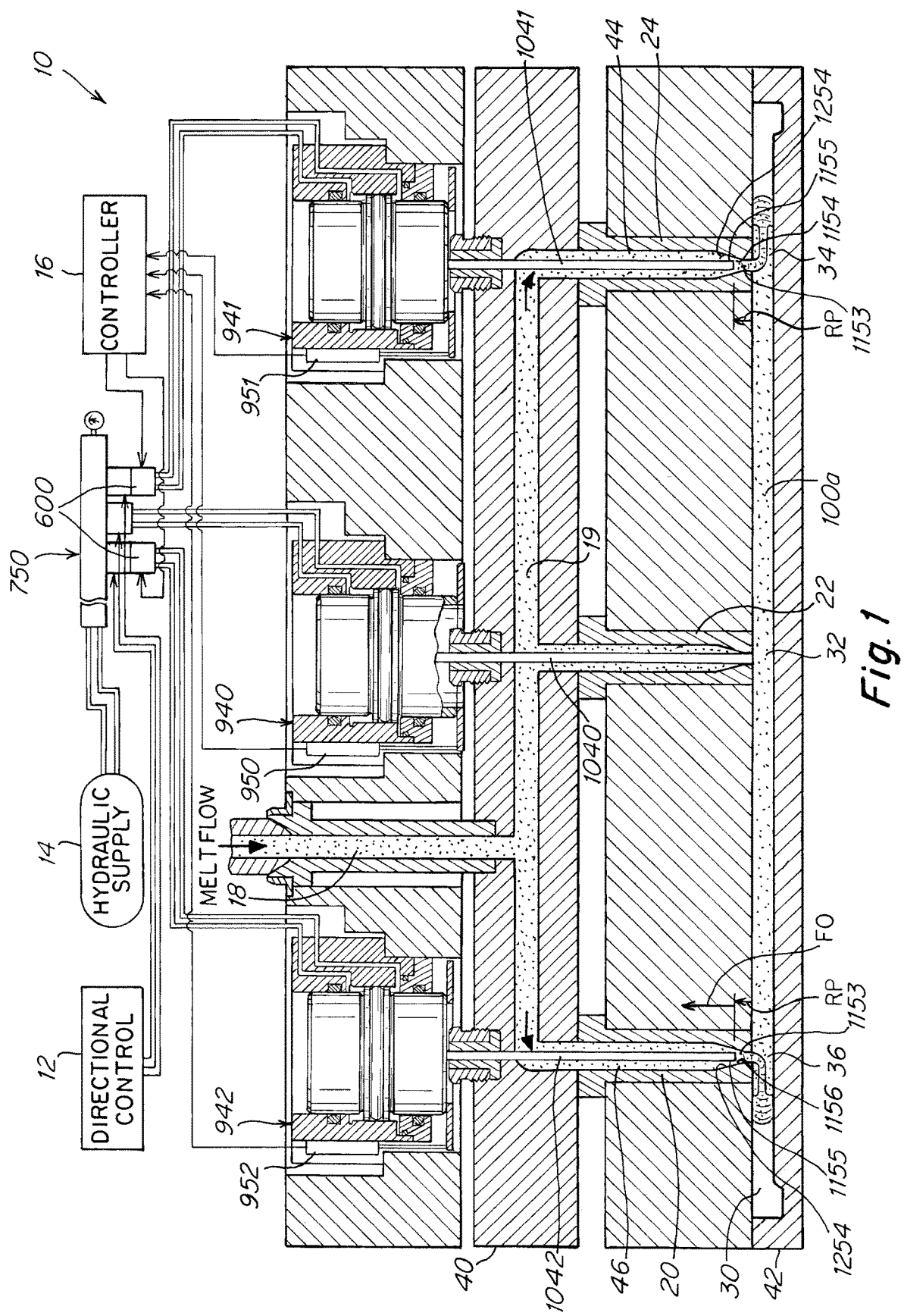

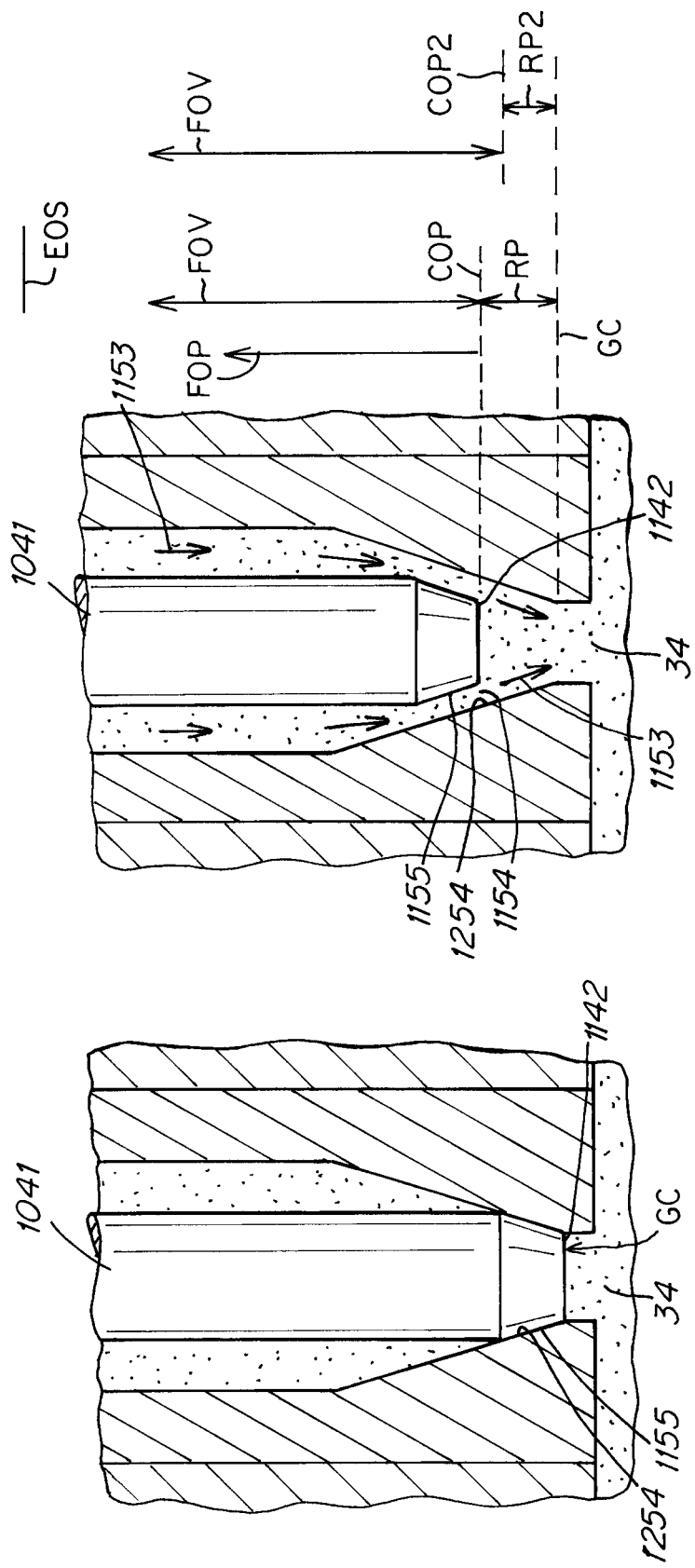

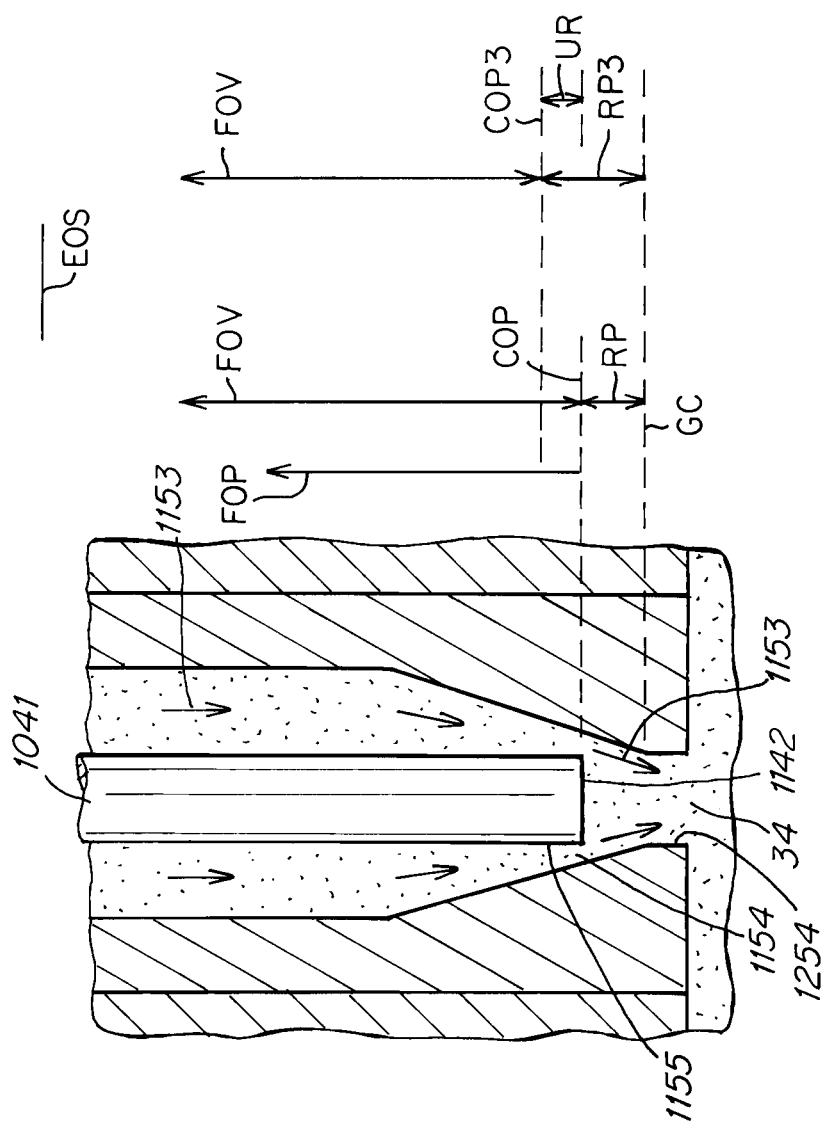

INJECTION MOLDING FLOW CONTROL APPARATUS AND METHOD

RELATED APPLICATIONS

This application is a continuation of and claims the benefit of priority of U.S. application Ser. No. 15/480,447 filed Apr. 6, 2017, which is a continuation of and claims the benefit of priority to U.S. application Ser. No. 15/480,447 filed Apr. 6, 2017 which is a continuation of and claims the benefit of priority to U.S. application Ser. No. 14/567,369 filed Dec. 11, 2014 which is a divisional and claims the benefit of priority of U.S. application Ser. No. 13/484,336 filed May 31, 2012 which is a continuation of and claims the benefit of priority of PCT/US11/62099 filed Nov. 23, 2011 which in turn claims the benefit of priority to U.S. Provisional Application Ser. No. 61/475,340 filed Apr. 14, 2011 and to U.S. Provisional Application Ser. No. 61/416,583 filed Nov. 23, 2010, the disclosures of all of the foregoing of which are incorporated by reference herein in their entirety as if fully set forth herein.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. Nos. 6,599,116, 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar. 19, 2002 (7070).

BACKGROUND OF THE INVENTION

Injection molding systems have been developed having flow control mechanisms that control the movement of a valve pin over the course of an injection cycle to cause the pin to move either upstream or downstream over the course of injection cycle in order to raise or lower the rate of flow of fluid material to correspond to a predetermined profile of fluid flow rates for the injection cycle. A sensor senses a condition of the fluid material or of the apparatus such as pin position and sends a signal indicative of the sensed condition to a program contained in a controller that uses the signal as a variable input to control movement of the valve pin in accordance with the predetermined profile.

SUMMARY OF THE INVENTION

In accordance with the invention there is provided a method of performing an injection molding cycle in an injection molding apparatus comprising:
a manifold that receives an injection fluid mold material, the manifold having a delivery channel that delivers the injection fluid mold material under an injection pressure to a first gate of a mold cavity, an actuator drivably interconnected to a valve pin having a tip end drivable along a drive path that extends between a first position where the tip end of the valve pin obstructs the gate to prevent the injection fluid material from flowing into the cavity, a second position upstream of the first position wherein the tip end of the valve pin restricts flow of the injection fluid along at least a portion of the length of the drive path extending between the first position and the second position, and a third position upstream of the second position where the injection fluid material flows freely without restriction from the tip end of the pin through the first gate, the actuator being driven by a valve system that is controllably adjustable between a start position, one or more intermediate drive rate positions and a high drive rate position, the actuator being driven upstream at one or more corresponding intermediate rates of travel when the valve system is in the one or more intermediate drive rate positions and at a higher rate of travel than the one or more intermediate rates of travel when the valve system is in the high drive rate position, the method comprising:
  selecting the length of travel between the first position and the second position,
  beginning an injection cycle with the tip end of the valve pin in the first position and the valve system in the start position,
  adjusting the valve system to operate at the one or more selected intermediate drive rate positions to drive the tip end of the valve pin continuously upstream from the first position to the second position,
  sensing the position of the valve pin to determine when the tip end of the valve pin has reached the second position,
  adjusting the valve system to operate at the high drive rate position to drive the tip end of the valve pin continuously upstream at the higher rate of travel when the tip end of the valve pin has been determined in the step of sensing to have reached the second position.

The step of adjusting the valve system to operate at the one or more selected intermediate drive rate positions is typically begun after the injection fluid mold material has been previously injected into the cavity through another gate and the fluid mold material has travelled through the cavity past the first gate.

The step of adjusting the valve system to operate at the one or more selected intermediate drive rate positions typically comprises adjusting the valve system to operate at a single intermediate drive rate position. The high drive rate position of the valve system drives the actuator at a rate of travel that is a maximum at which the valve system is capable of driving the actuator.

The valve system is typically interconnected to an electrical signal generating device operable to generate an electrical signal of controllably variable degree, the valve system being adjustable in position to increase the flow of drive fluid to a degree that is proportional to the degree of electrical signal input by the electrical signal generating device to the valve system, the steps of adjusting the valve system comprising operating the electrical signal generating device to adjust the positions of the valve system.

Each of the start, intermediate drive rate and high drive rate positions of the valve system have a different degree of openness, the drive fluid of the valve system driving the actuator and the valve pin at a rate that is approximately proportional to the degree of openness of the positions of the valve system, the one or more intermediate drive rate positions having a degree of openness that is less than the degree of openness of the high drive rate position.

The length of travel between the first position and the second position along the drive path is preferably selected to be between about 1 mm and about 5 mm.

The step of sensing includes sensing the position of the valve pin with a position sensor that automatically sends one or more signals indicative of the position of the tip end of the valve pin to a control mechanism that automatically adjusts the positions of the valve system in response to receipt of the one or more signals from the position sensor.

The control mechanism preferably comprises an electrical signal generating device operable to generate an electrical signal of controllably variable degree, the valve system being adjustable in position to a degree of openness that is approximately proportional to the degree of electrical signal input by the electrical signal generating device to the valve system, the steps of adjusting the valve system comprising operating the electrical signal generating device to controllably adjust the degree of electrical signal input to the valve system.

The tip end of the valve pin preferably restricts flow of the injection fluid along the entire length of the drive path extending between the first position and the second position.

In another aspect of the invention there is provided an apparatus for controlling the rate of flow of fluid mold material from an injection molding machine to a mold cavity, the apparatus comprising:

a manifold receiving the injected fluid mold material, the manifold having a delivery channel that delivers the injected fluid material to a first gate leading to the mold cavity;

an actuator interconnected to a valve pin having a tip end drivable along a drive path that extends between a first position where the tip end of the valve pin obstructs the first gate to prevent the injection fluid material from flowing into the cavity, a second position upstream of the first position wherein the tip end of the valve pin restricts flow of the injection fluid through the first gate along at least a portion of the length of the drive path extending between the first position and the second position, and a third position upstream of the second position where the injection fluid material flows freely through the first gate without restriction from the tip end of the pin, the actuator and the valve pin being translationally driven at a controllable rate of travel by a valve system that is controllably adjustable between a start position, one or more intermediate drive rate positions and a high drive rate position, the actuator being driven upstream at one or more intermediate rates of travel when the valve system is in the one or more intermediate drive rate positions and at a higher rate of travel than the one or more intermediate rates of travel when the valve system is in the high drive rate position;

a position sensor and a controller, the position sensor sensing the position of the valve pin and sending a signal indicative of the position of the pin to the controller;

the controller instructing the valve system to drive the actuator and the valve pin continuously upstream from the start position to the second position to the third position;

the controller including instructions that instruct the valve system to move from the start position to the one or more intermediate drive rate positions and subsequently from the one or more intermediate drive rate positions to the high drive rate position on receipt by the controller of a signal from the position sensor that is indicative of the valve pin having reached the second position.

Such an apparatus of can further comprise an electrical signal generating device interconnected to the valve system to controllably drive the valve system to selected degrees of openness, the electrical signal generating device generating an electrical signal of controllably variable degree of output, the valve system being adjustable in degree of openness that is approximately proportional to the degree of output of the electrical signal.

The electrical signal generating device is interconnected to the controller, the controller instructing the electrical signal generating device to generate electrical signals of varying degrees of output that correspond to a degree of openness of the one or more intermediate drive rate positions and the third drive rate position of the valve system.

The portion of the drive path over which the flow of injected material is restricted is typically at least about 30%, typically at least about 70%, and can be the entirety of the length of the drive path between the first position and the second position. The length of the drive path between the first position and the second position is typically between about 1 mm and about 5 mm.

The valve pin and actuator are typically driven at a maximum rate of upstream travel that the valve system is capable of driving the actuator at when the valve system is in the high drive rate position. The rate of travel of the valve pin corresponding to the highest of the one or more intermediate drive positions of the valve system is typically less than about 75% of the rate of travel of the valve pin corresponding to the high drive position.

The positions of the valve system each have a different degree of openness, the actuator and valve pin being driven at a velocity that is proportional to the degree of openness of the positions of the valve system, the controller instructing the generation of an electrical signal that adjusts the valve system to a degree of openness that is proportional to a degree of output of the electrical signal, the controller being programmable to instruct the generation of one or more first electrical signals having one or more corresponding first selected degrees of output that moves the valve system to the one or more intermediate drive rate positions to drive the actuator at one or more first velocities in an upstream direction, the controller being programmed to instruct the generation of a second electrical signal when the controller receives a signal from the position sensor that the tip end of the valve pin has reached the second position, the second electrical signal having a second selected degree of output that moves the valve system to the high drive rate position that drives the actuator at a second velocity that is higher than the one or more first velocities.

The valve system is driven to a degree of openness that is approximately proportional to the degree of output of the electrical signal.

Further in accordance with the invention there is provided an An apparatus for controlling the rate of flow of a fluid mold material from an injection molding machine to a mold cavity, the apparatus comprising:

a manifold receiving the injected fluid mold material, the manifold having a delivery channel that delivers the fluid mold material to a gate to the mold cavity;

an actuator interconnected to a valve pin having a tip end, the actuator moving the valve pin continuously upstream along a path of travel between a downstream gate closed position and an intermediate upstream gate open position, the downstream gate closed position being a position wherein the tip end of the valve pin obstructs the gate to prevent fluid material from flowing into the mold cavity, the intermediate upstream gate open position being a predetermined position between the downstream gate closed position and a fully open, end of stroke position upstream of the intermediate upstream gate open position at which the fluid mold material flows at a maximum rate through the gate;

a controller interconnected to the actuator that controls movement of the actuator at least in part according to instructions that instruct the actuator to move the valve pin continuously upstream at one or more selected intermediate velocities over the course of travel of the valve pin from the downstream gate closed position to the intermediate upstream gate open position.

the controller further controlling movement of the actuator continuously upstream from the intermediate upstream gate open position to the fully open, end of stroke position at one or more velocities that are higher than the one or more selected intermediate velocities.

The actuator is typically driven by a drive fluid having a maximum rate of flow into or out of the actuator to drive the valve pin at a maximum upstream velocity, the one or more selected velocities being selected by selecting a rate of flow of drive fluid to or from the actuator that is a selected fraction of the maximum rate of flow. The drive fluid can be liquid or gaseous.

The tip end of the valve pin and the gate are typically adapted to cooperate with each other to restrict and continuously increase rate of flow of the fluid material through the gate over the course of at least a portion of the continuous upstream travel of the valve pin from the downstream gate closed position to the intermediate upstream gate open position.

Such an apparatus preferably further comprises a sensor that generates one or more signals indicative of the position of the valve pin, the controller carrying out instructions to cause the valve pin to move continuously upstream at the one or more selected intermediate velocities and to adjust upstream velocity of the valve pin based on one or more of the signals generated by the sensor.

The instructions typically cause velocity of the valve pin to be adjusted to a selected higher velocity in response to a signal generated by the sensor having detected and indicating the valve pin has reached the intermediate upstream gate open position.

The selected higher velocity is typically a maximum velocity at which the actuator is capable of driving the valve pin. The tip end of the valve pin and the gate are typically adapted to cooperate with each other to restrict to less than the maximum flow rate and continuously increase rate of flow of the fluid material through the gate over the course of at least a portion of the continuous upstream travel of the valve pin from the downstream gate closed position to the intermediate upstream gate open position.

The one or more selected intermediate velocities are less than about 75% of the higher velocities. The one or more selected intermediate velocities can be a single selected velocity.

The instructions of the controller can utilize the signals received from the sensor to calculate real time velocity of the valve pin and compare the calculated real time velocity to one or more predetermined velocities for the pin during the course of travel of the tip end of the pin from at least the downstream gate closed position to the intermediate upstream gate open position. In such an embodiment, the controller preferably compares the calculated real time velocity to the predetermined velocities and sends a signal instructing the actuator to match the velocity of the pin to the predetermined velocities based on the comparison at any given position of the valve pin. In such an embodiment, the instructions and the sensor signals comprise a closed loop control. In such an embodiment, the controller calculates real time velocity based a value corresponding to the position of the pin signal received in real time from the sensor.

The actuator is typically driven by a fluid flowing through a flow valve that opens and closes to a controllably variable degree to vary velocity of the valve pin in response to an electronic or electric signal received from the controller that is controllably variable.

The apparatus preferably further comprises a position sensor that sends signals to the controller indicative of the position the fluid driven motor at least during movement of the valve pin from the downstream gate closed position to the intermediate upstream gate open position, the controller carrying out the instructions to move the valve pin at the one or more selected velocities based on the signals received from the sensor.

The valve preferably opens and closes to a degree that is proportional to the strength or degree of output of the controllably variable electric or electronic signal.

The actuator can comprise an electrically driven motor interconnected to the valve pin that moves the valve pin at a controllably variable rate in response to an electric or electronic signal received from the controller that is controllably variable. In such an embodiment, the apparatus preferably further comprises a position sensor that sends signals to the controller indicative of the position the electrically driven motor at least during movement of the valve pin from the downstream gate closed position to the intermediate upstream gate open position, the controller carrying out the instructions to move the valve pin at the one or more selected velocities based on the signals received from the sensor.

In such an embodiment, the controller, in response to the one or more signals received from the sensor, can instruct the actuator to move the valve pin continuously upstream of the intermediate upstream gate open position to a fully open, end of stroke position at one or more velocities that are higher than the one or more velocities of the valve pin during travel from the downstream gate closed position to the intermediate upstream gate open position.

In another embodiment of the invention there is provided an apparatus for controlling the rate of flow of fluid material from an injection molding machine to a mold cavity, the apparatus comprising:

a manifold receiving the injected fluid material, the manifold having a delivery channel that delivers the fluid material to a gate to the mold cavity;

an actuator interconnected to a valve pin having a tip end, the actuator moving the valve pin continuously upstream along a path of travel between a downstream gate closed position and an intermediate upstream gate open position between the downstream gate closed position and a fully open, end of stroke position upstream of the intermediate upstream gate open position, the downstream gate closed position being a position wherein the tip end of the valve pin obstructs the gate to prevent fluid material from flowing into the mold cavity, the intermediate upstream gate open position being a position wherein the fluid material flows through the gate;

a sensor that sends one or more signals indicative of the position of the valve pin to a controller at least during movement of the valve pin upstream from the downstream gate closed position to the intermediate upstream gate open position, the controller carrying out instructions to move the valve pin at one or more selected velocities over the course of movement of the valve pin from the downstream gate closed position to the upstream gate open position based on the one or more signals received from the sensor;

the controller, in response to the one or more signals received from the sensor, instructing the actuator to move the valve pin continuously upstream of the intermediate upstream gate open position to a fully open, end of stroke position at one or more velocities that are higher than the one or more selected velocities of the valve pin.

In such an embodiment, the sensor typically comprises a position sensor that senses position of the valve pin or the actuator. The actuator is typically driven by a drive fluid having a maximum rate of flow into or out of the actuator to drive the valve pin at a maximum upstream velocity, the one or more selected velocities being selected by selecting a rate of flow of drive fluid into or out of the actuator that is a selected fraction of the maximum rate of flow.

The tip end of the valve pin and the gate are typically adapted to cooperate with each other to continuously increase rate of flow of the fluid material through the gate over the course of at least a portion of the continuous upstream travel of the pin from the downstream gate closed position to the intermediate upstream gate open position. The controller typically carries out the instructions based on a user input value indicative of the one or more selected velocities.

The path of travel between the downstream gate closed position and the intermediate upstream gate open position is at preferably least about 2 mm.

The pin is preferably drivable at a maximum velocity, the one or more selected velocities of the pin between the downstream gate closed position and the intermediate position being less than about 90% of the maximum velocity.

The one or more selected velocities of the pin over the path of travel between the downstream gate closed position and the intermediate upstream gate open position are typically a single selected velocity.

The instructions can utilize the signals received from the sensor to calculate real time velocity of the valve pin and compare the calculated real time velocity to one or more predetermined velocities for the pin during the course of travel of the tip end of the pin from at least the downstream gate closed position to the upstream gate open position, the controller instructing the actuator to conform the velocity of the valve pin to the one or more predetermined velocities. In such a system the controller and position sensor signals comprise a closed loop control.

The actuator is typically driven by fluid flowing through a fluid flow valve that opens and closes to a controllably variable degree to controllably vary velocity of the valve pin according to an electrical or electronic signal received from the controller that is controllably variable. The fluid flow valve preferably opens and closes at a rate that is proportional to the degree or intensity of the electrical or electronic signal received from the controller.

The actuator can comprise an electrically driven motor interconnected to the valve pin that moves the valve pin at a controllably variable rate according to an electrical or electronic signal received from the controller that is controllably variable.

In another aspect of the invention there is provided a sequentially gated molding system comprising a mold having first and second gates leading to a common cavity and a manifold having first and second fluid flow channels respectively delivering a fluid material through the first and second gates into the cavity, the system comprising:

a first valve controlling delivery of the fluid material through the first gate into the cavity beginning at a first time;

a second valve controlling delivery of the fluid material through the second gate beginning at a second time subsequent to the first time such that the fluid material has entered the cavity through the first gate and approached the second gate prior to the second time;

the second valve comprising an actuator interconnected to a valve pin having a tip end, the actuator moving the valve pin continuously upstream along a path of travel between a downstream gate closed position and an intermediate upstream gate open position, the downstream gate closed position being a position wherein the tip end of the valve pin obstructs the second gate to prevent fluid material from flowing into the mold cavity, the intermediate upstream gate open position being a predetermined position between the downstream gate closed position and a fully open, end of stroke position upstream of the intermediate upstream gate open position;

a controller interconnected to the actuator that controls movement of the actuator at least in part according to instructions that instruct the actuator to move the valve pin continuously upstream at one or more selected velocities over the course of travel of the valve pin from the downstream gate closed position to the intermediate upstream gate open position.

In such an embodiment, the actuator moves the valve pin continuously upstream during the course of movement of the valve pin from the intermediate upstream gate open position to the fully open, end of stroke position at one or more velocities that are higher than the one or more selected velocities.

The one or more selected velocities of the pin over the path of travel between the downstream gate closed position and the intermediate upstream gate open position can be a single selected velocity.

The controller, in response to the one or more signals received from the sensor, preferably instructs the actuator to move the valve pin continuously upstream of the intermediate upstream gate open position to the fully open, end of stroke position.

The actuator is typically driven by a fluid flowing through a flow valve that opens and closes to a degree that is proportional to the strength or degree of a controllably variable electric or electronic signal.

The instructions of the controller can utilize the signals received from the sensor to calculate real time velocity of the valve pin and compare the calculated real time velocity to one or more predetermined velocities for the pin during the course of travel of the tip end of the pin from at least the downstream gate closed position to the intermediate upstream gate open position, the controller comparing the calculated velocity to the one or more predetermined velocities and sending a signal instructing the actuator to match the velocity of the pin to the one or more predetermined velocities based on the comparison at any given position of the valve pin.

The first valve typically comprises a center actuator interconnected to a center valve pin having a tip end, the center actuator moving the center valve pin continuously upstream along a path of travel between a downstream gate closed position and an intermediate upstream gate open position, the downstream gate closed position being a position wherein the tip end of the center valve pin obstructs the first gate to prevent fluid material from flowing into the mold cavity, the intermediate upstream gate open position being a predetermined position between the downstream gate closed position and a fully open, end of stroke position upstream of the intermediate upstream gate open position;

the controller being interconnected to the center actuator to control movement of the center actuator at least in part according to instructions that instruct the center actuator to move the center valve pin continuously upstream at one or more selected velocities over the course of travel of the center valve pin from the downstream gate closed position to the intermediate upstream gate open position.

In such an embodiment, the actuator can comprise an electrically driven motor interconnected to the valve pin that moves the valve pin at a controllably variable rate according to an electrical or electronic signal received from the controller that is controllably variable.

In another embodiment of the invention there is provided an injection molding apparatus comprising a manifold receiving an injected fluid material, the manifold having a delivery channel that delivers the fluid material to a gate to the mold cavity, an actuator interconnected to a valve pin having a tip end and a drive system that is controllable to operate the actuator to move the valve pin at selectively controllable velocities, a method for performing an injection molding cycle, the method comprising:
  selecting one or more selected velocities of movement of the valve pin along a continuous path of upstream travel beginning from a downstream gate closed position to an intermediate upstream gate open position that is between the downstream gate closed position and a fully open, end of stroke position,
  sensing the position of the valve pin,
  generating and sending a first control signal to the drive system that instructs the drive mechanism to drive the actuator to move the valve pin continuously upstream at the one or more first selected velocities beginning from the downstream gate closed position to the intermediate upstream gate open position,
  generating and sending a second control signal to the drive system based on a sensing of the position of the valve pin being at the intermediate upstream gate open position, the second control signal instructing the drive mechanism to drive the actuator to move the valve pin continuously upstream from the intermediate upstream gate open position to the fully open, end of stroke position at one or more second selected velocities that are higher than the one or more first selected velocities.

In another aspect of the invention there is provided, a method of performing an injection molding cycle in an injection molding apparatus comprising:
  an injection molding machine and a manifold that receives an injected mold material from the injection molding machine, the manifold having a delivery channel that delivers the mold material under an injection pressure to a first gate of a mold cavity,
  an actuator interconnected to a valve pin driving the valve pin from a first position where the tip end of the valve pin obstructs the gate to prevent the injection fluid material from flowing into the cavity, the actuator further driving the valve pin upstream to a second position upstream of the gate where the mold material flows at a maximum rate through the gate and continuously upstream from the start position through one or more intermediate positions between the first position and the second position wherein the tip end of the valve pin restricts flow of the injection fluid to one or more rates less than the maximum rate,
  a drive system for controllably driving the actuator and the valve pin upstream at one or more selected intermediate velocities and at one or more high velocities that are higher than the intermediate velocities,
the method comprising:
beginning an injection cycle with the tip end of the valve pin in the first position,
adjusting the drive system to drive the actuator at the one or more intermediate velocities to drive the valve pin continuously upstream through one or more of the intermediate positions,
sensing the position of the pin, and
adjusting the drive system to adjust upstream velocity of the valve pin from the one or more intermediate velocities to the one or more high velocities upon sensing of the valve pin at a selected position downstream of the second position.

In such a method, the step of adjusting the drive system to drive the actuator at the one or more intermediate velocities is preferably carried out after the mold material has been injected into the cavity through another gate and has travelled through the cavity past the first gate.

BRIEF DESCRIPTION OF THE DRAWINGS

The above and further advantages of the invention may be better understood by referring to the following description in conjunction with the accompanying drawings in which:

FIG. 1 is a schematic cross-sectional side view of one embodiment of the invention showing a pair of sequential gates showing a first gate entering the center of a cavity having been opened and shown closed such that a first shot of fluid material has entered the cavity and traveled past the position of a second sequential gate, the second gate shown being open with its valve pin having traveled along an upstream restricted flow path RP allowing a second sequential shot of fluid material to flow into and merge with the first shot of material within the cavity;

FIGS. 3A-3B show tapered end valve pin positions at various times and positions between a starting closed position as in FIG. 3A and various upstream opened positions, RP representing a selectable path length over which the velocity of withdrawal of the pin upstream from the gate closed position to an open position is reduced (via a controllable flow restrictor) relative to the velocity of upstream movement that the valve pin would normally have over the uncontrolled velocity path FOV when the hydraulic pressure is normally at full pressure and pin velocity is at its maximum;

FIGS. 4A-4B show a system having a valve pin that has a cylindrically configured tip end, the tips ends of the pins being positioned at various times and positions between a starting closed position as in FIG. 4A and various upstream opened positions, RP wherein RP represents a path of selectable length over which the velocity of withdrawal of the pin upstream from the gate closed position to an open position is reduced (via a controllable flow restrictor or electric actuator) relative to the velocity of upstream movement that the valve pin would normally have over the uncontrolled velocity path FOV when the hydraulic pressure of a hydraulic actuator is normally at full pressure and pin velocity is at its maximum;

DETAILED DESCRIPTION

Figure 1A:
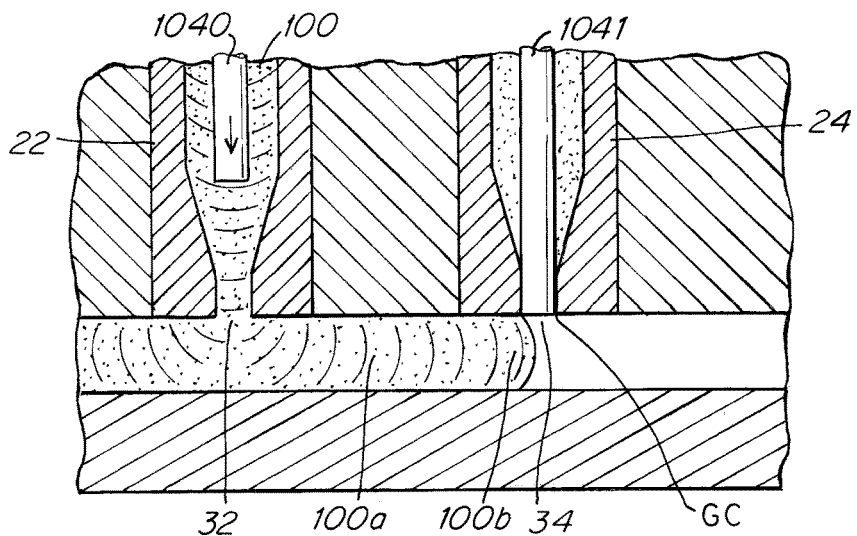
FIGS. 1A-1E are schematic cross-sectional close-up views of the center and one of the lateral gates of the FIG. 1 apparatus showing various stages of the progress of injection.
Figure 1B:
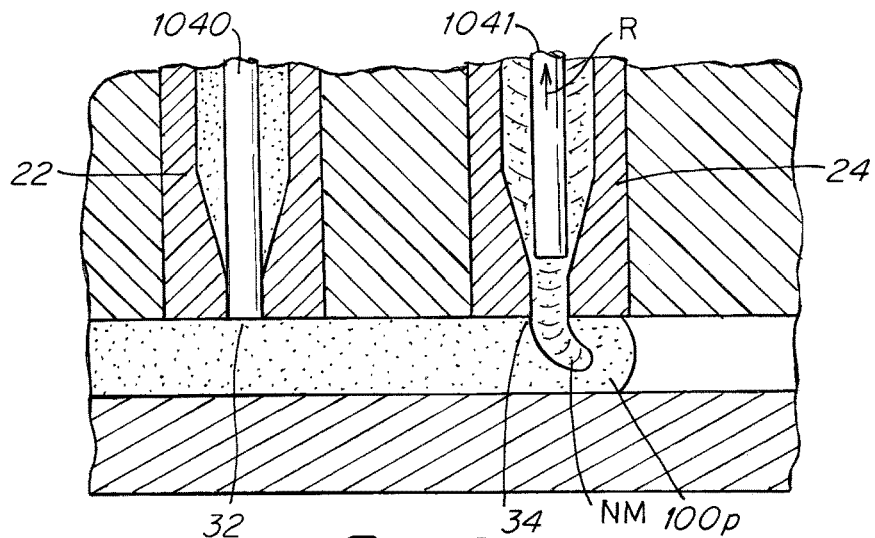
Figure 1C:
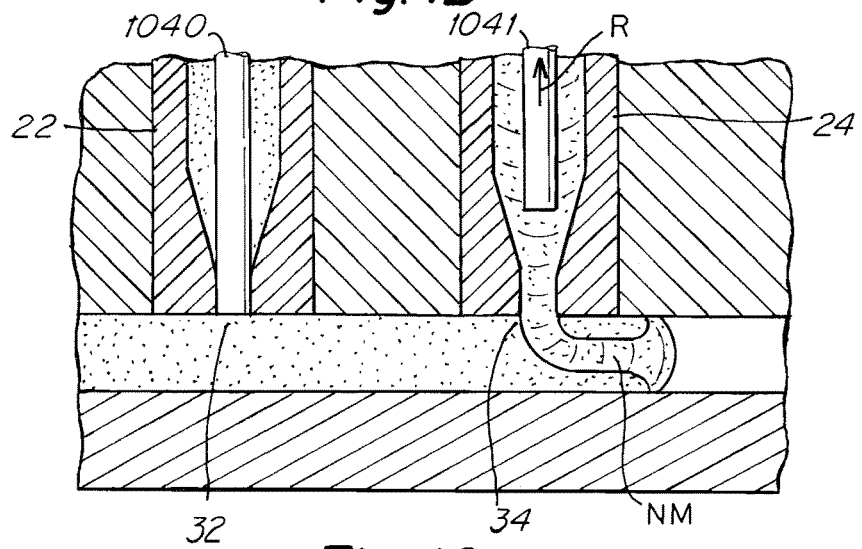
Figure 1D:
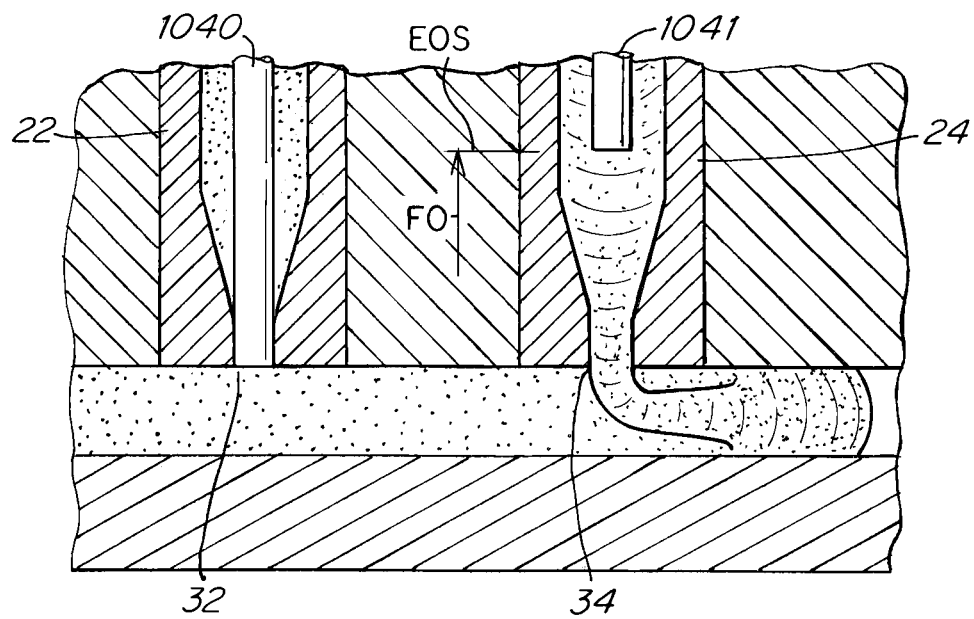
Figure 1E:
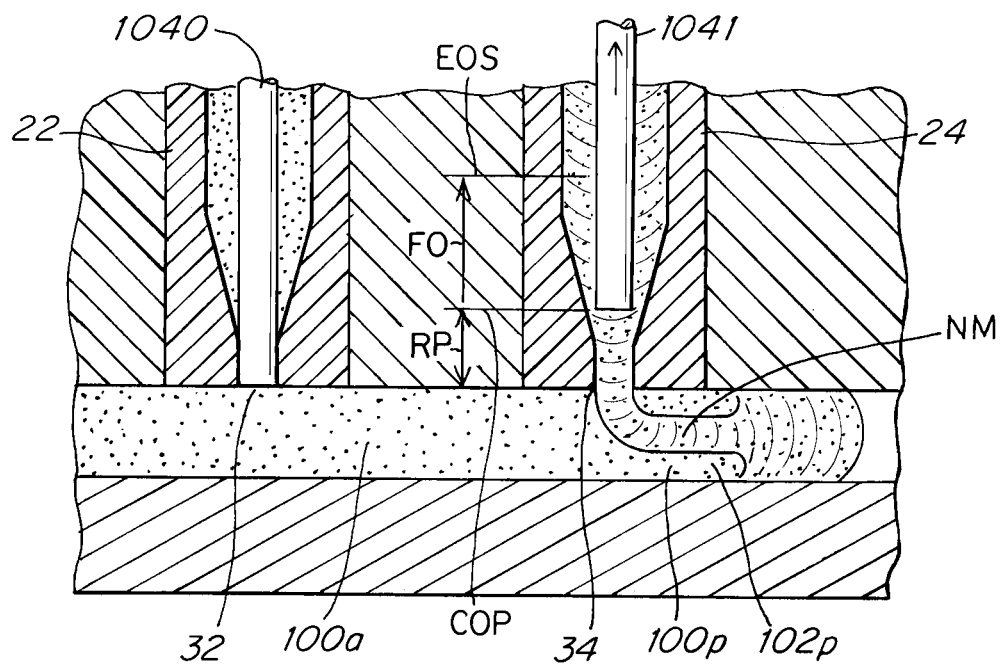

FIG. 1 shows a system 10 with a central nozzle 22 feeding molten material from an injection molding machine through a main inlet 18 to a distribution channel 19 of a manifold 40. The distribution channel 19 commonly feeds three separate nozzles 20, 22, 24 which all commonly feed into a common cavity 30 of a mold 42. One of the nozzles 22 is controlled by actuator 940 and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

As shown in FIGS. 1, 1A the injection cycle is a cascade process where injection is effected in a sequence from the center nozzle 22 first and at a later predetermined time from the lateral nozzles 20, 24. As shown in FIG. 1A the injection cycle is started by first opening the pin 1040 of the center nozzle 22 and allowing the fluid material 100 (typically polymer or plastic material) to flow up to a position 100*a* in the cavity just before 100*b* the distally disposed entrance into the cavity 34, 36 of the gates of the lateral nozzles 24, 20 as shown in FIG. 1A. After an injection cycle is begun, the gate of the center injection nozzle 22 and pin 1040 is typically left open only for so long as to allow the fluid material 100 to travel to a position 100*p* just past the positions 34, 36. Once the fluid material has travelled just past 100*p* of the lateral gate positions 34, 36, the center gate 32 of the center nozzle 22 is typically closed by pin 1040 as shown in FIGS. 1B, 1C, 1D and 1E. The lateral gates 34, 36 are then opened by upstream withdrawal of lateral nozzle pins 1041, 1042 as shown in FIGS. 1B-1E. As described below, the rate of upstream withdrawal or travel velocity of lateral pins 1041, 1042 is controlled as described below.

In alternative embodiments, the center gate 32 and associated actuator 940 and valve pin 1040 can remain open at, during and subsequent to the times that the lateral gates 34, 36 are opened such that fluid material flows into cavity 30 through both the center gate 32 and one or both of the lateral gates 34, 36 simultaneously.

When the lateral gates 34, 36 are opened and fluid material NM is allowed to first enter the mold cavity into the stream 102*p* that has been injected from center nozzle 22 past gates 34, 36, the two streams NM and 102*p* mix with each other. If the velocity of the fluid material NM is too high, such as often occurs when the flow velocity of injection fluid material through gates 34, 36 is at maximum, a visible line or defect in the mixing of the two streams 102*p* and NM will appear in the final cooled molded product at the areas where gates 34, 36 inject into the mold cavity. By injecting NM at a reduced flow rate for a relatively short period of time at the beginning when the gate 34, 36 is first opened and following the time when NM first enters the flow stream 102*p*, the appearance of a visible line or defect in the final molded product can be reduced or eliminated.

Figure 2:
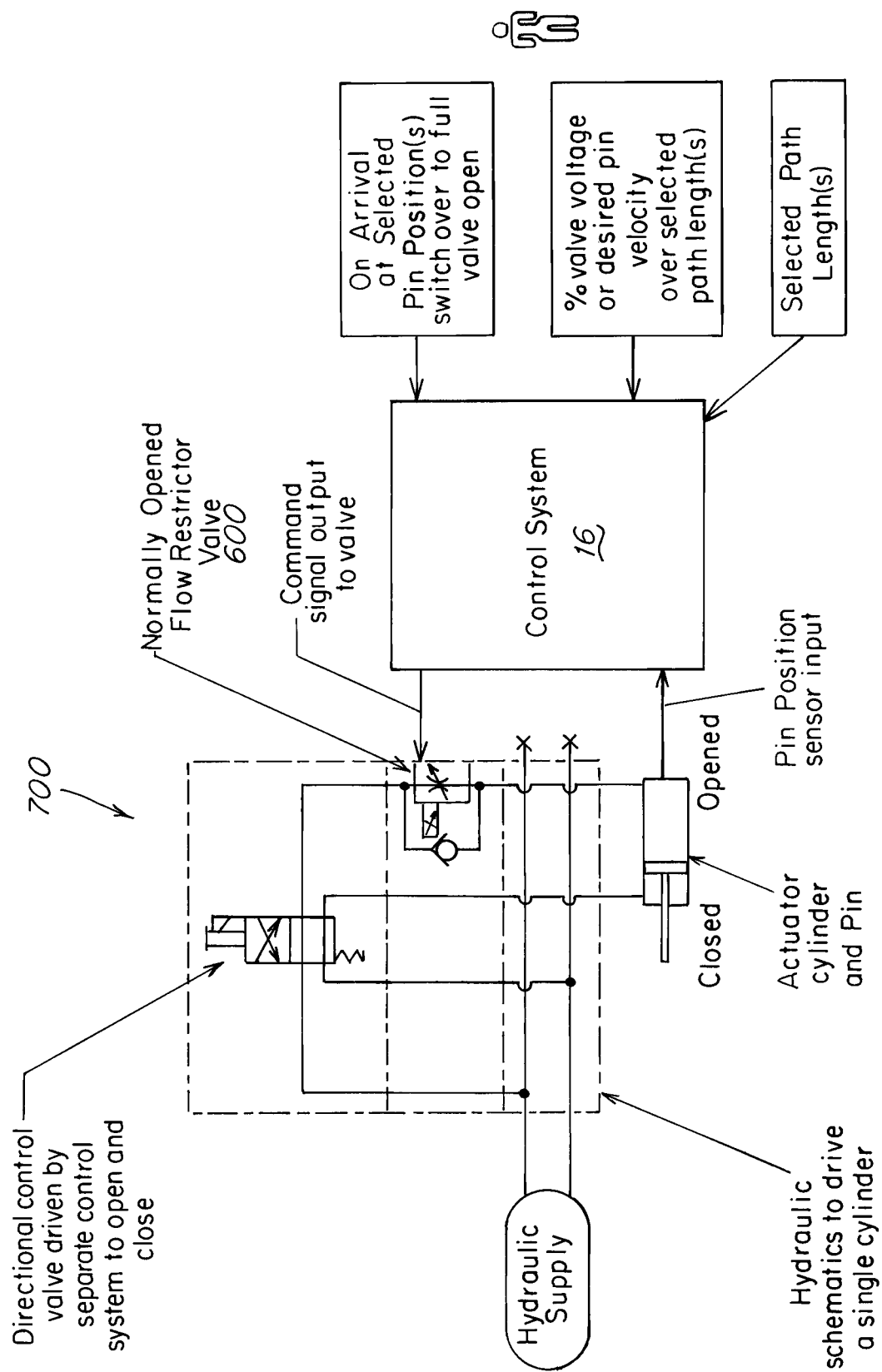
FIG. 2 is a schematic diagram of one embodiment of the invention showing generically a hydraulically actuated valve pin in which at least one port of the actuator is connected to a flow restrictor so as to restrict the flow of hydraulic drive fluid and slow the opening of the valve pin by a selected lessening of pin opening velocity by use of a controller interconnected to the flow restrictor, the controller enabling the user to select a percentage of predetermined full open position velocity that the hydraulic drive supply to the actuator normally operates at full open velocity drive fluid pressure.

The rate or velocity of upstream withdrawal of pins 1041, 1042 starting from the closed position is controlled via controller 16, FIGS. 1, 2 which controls the rate and direction of flow of hydraulic fluid from the drive system 700 to the actuators 940, 941, 942. A "controller," as used herein, refers to electrical and electronic control apparati that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in typical or preferred embodiments of the invention, actuators powered by an electric or electronic motor or drive source can alternatively be used as the actuator component.

Figure 2A:
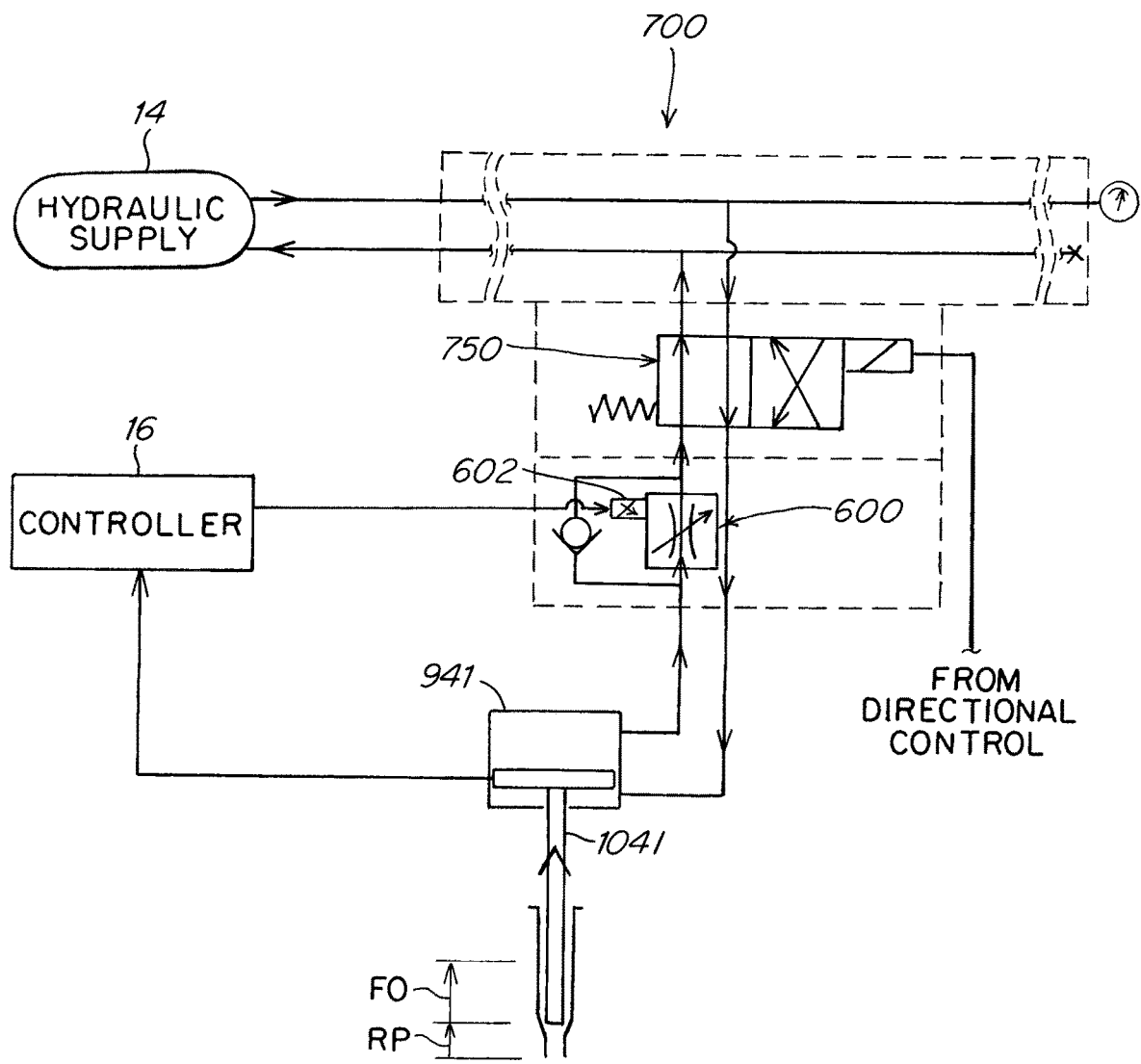
FIGS. 2A, 2B are schematic cross-sectional views of the hydraulic valves and restrictors used in the system of FIG. 1 according to the invention.
Figure 2B:
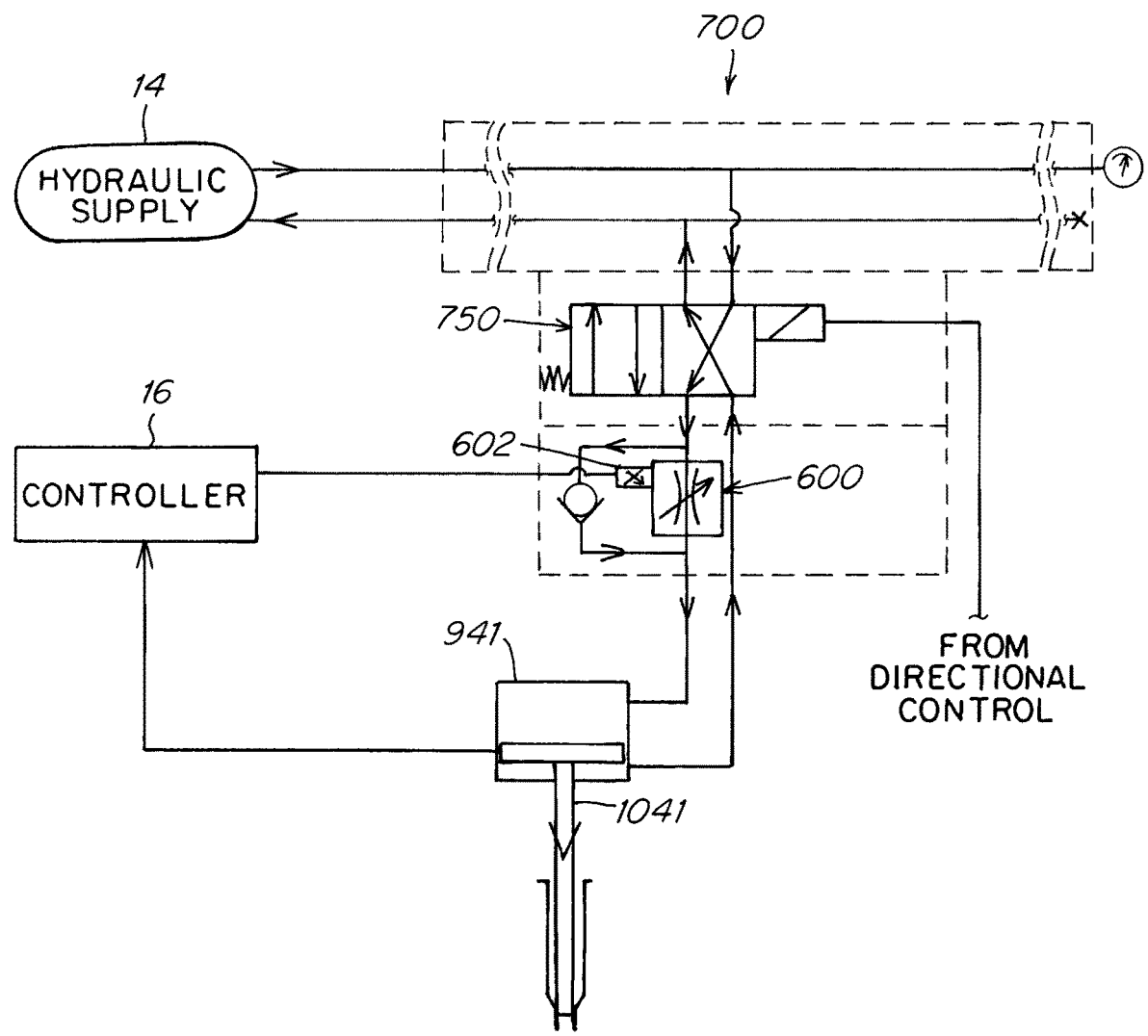

As shown in FIGS. 2A, 2B, a supply of hydraulic fluid 14 is fed first through a directional control valve 750 mechanism that switches the hydraulic fluid flow to the actuator cylinders in either of two directions: fluid out to withdraw the pin upstream, FIG. 2A, and fluid in to drive the pin downstream, FIG. 2B. At the beginning of an injection cycle the gate of a lateral valve 34, 36 is closed and the hydraulic system is in the directional configuration of FIG. 2B. When a cycle is started, the directional configuration of the directional valve 750 of the hydraulic system 700 is switched by controller 16 to the configuration of FIG. 2A. The hydraulic system includes a flow restriction valve 600 that can vary the rate of flow of hydraulic fluid to the actuator 941 under the control of the controller 16 to vary the rate of travel, upstream or downstream of the piston of the actuator 941 which in turn controls the direction and rate of travel of pin 1041. Although not shown in FIGS. 2A, 2B, the hydraulic system 700 controls the direction and rate of travel of the pistons of actuators 940 and 942 in a manner similar to the manner of control of actuator 941 via the connections shown in FIG. 1.

The user programs controller 16 via data inputs on a user interface to instruct the hydraulic system 700 to drive pins 1041, 1042 at an upstream velocity of travel that is reduced relative to a maximum velocity that the hydraulic system can drive the pins 1041, 1042 to travel. As described below, such reduced pin withdrawal rate or velocity is executed until a position sensor such as 951, 952 detects that an actuator 941, 952 or an associated valve pin (or another component), has reached a certain position such as the end point COP, COP2, FIGS. 3B, 4B of a restricted flow path RP, RP2. A typical amount of time over which the pins are withdrawn at a reduced velocity is between about 0.01 and 0.10 second, the entire injection cycle time typically being between about 0.3 seconds and about 3 seconds, more typically between about 0.5 seconds and about 1.5 seconds.

FIG. 1 shows position sensors 950, 951, 952 for sensing the position of the actuator cylinders 940, 941, 942 and their associated valve pins (such as 1040, 1041, 1042) and feed such position information to controller 16 for monitoring purposes. As shown, fluid material 18 is injected from an injection machine into a manifold runner 19 and further downstream into the bores 44, 46 of the lateral nozzles 24, 22 and ultimately downstream through the gates 32, 34, 36. When the pins 1041, 1042 are withdrawn upstream to a position where the tip end of the pins 1041 are in a fully upstream open position such as shown in FIG. 1D, the rate of flow of fluid material through the gates 34, 36 is at a maximum. However when the pins 1041, 1042 are initially withdrawn beginning from the closed gate position, FIG. 1A, to intermediate upstream positions, FIGS. 1B, 1C, a gap 1154, 1156 that restricts the velocity of fluid material flow is formed between the outer surfaces 1155 of the tip end of the pins 44, 46 and the inner surfaces 1254, 1256 of the gate areas of the nozzles 24, 20. The restricted flow gap 1154, 1156 remains small enough to restrict and reduce the rate of flow of fluid material 1153 through gates 34, 36 to a rate that is less than maximum flow velocity over a travel distance RP of the tip end of the pins 1041, 1042 going from closed to upstream as shown in FIGS. 1, 1B, 1C, 1E and 3B, 4B.

The pins 1041 can be controllably withdrawn at one or more reduced velocities (less than maximum) for one or more periods of time over the entirety of the length of the path RP over which flow of mold material 1153 is restricted. Preferably the pins are withdrawn at a reduced velocity over more than about 50% of RP and most preferably over more than about 75% of the length RP. As described below with reference to FIGS. 3B, 4B, the pins 1041 can be withdrawn at a higher or maximum velocity at the end COP2 of a less than complete restricted mold material flow path RP2.

The trace or visible lines that appear in the body of a part that is ultimately formed within the cavity of the mold on cooling above can be reduced or eliminated by reducing or controlling the velocity of the pin 1041, 1042 opening or upstream withdrawal from the gate closed position to a selected intermediate upstream gate open position that is preferably 75% or more of the length of RP.

RP can be about 1-8 mm in length and more typically about 2-6 mm and even more typically 2-4 mm in length. As shown in FIG. 2 in such an embodiment, a control system or controller 16 is preprogrammed to control the sequence and the rates of valve pin 1040, 1041, 1042 opening and closing. The controller 16 controls the rate of travel, namely velocity of upstream travel, of a valve pin 1041, 1042 from its gate closed position for at least the predetermined amount of time that is selected to withdraw the pin at the selected reduced velocity rate.

The velocity of withdrawal of the valve pins 1041, 1042 is determined by regulation of the flow of hydraulic drive fluid that is pumped from a supply 14 to the actuators 941, 942 through a flow restrictor valve 600, FIGS. 1, 2, 2A, 2B. When the flow restrictor valve 600 is completely open, namely 100% open, allowing maximum flow of the pressurized hydraulic fluid to the actuator cylinders, the valve pins 1041, 1042 are driven at a maximum upstream travel velocity. According to the invention, the degree of openness of the flow restrictor valve is adjusted in response to sensing of position of a suitable component such as an actuator 941, 942 or associated valve pin to less than 100% open. Adjustment of the flow restrictor valve 600 to less than 100% open thus reduces the rate and volume flow of pressurized hydraulic fluid to the actuator cylinders thus in turn reducing the velocity of upstream travel of the pins 1041, 1042 for the selected period of time. At the end of the travel or length of path RP, RP2, a position sensor signals the controller 16, the controller 16 determines that the end COP, COP2 has been reached and the valve 600 is opened to a higher velocity, typically to its 100% open position to allow the actuator pistons and the valve pins 1041, 1042 to be driven at maximum upstream velocity FOV in order to reduce the cycle time of the injection cycle.

The valve 600 typically comprises a restrictor valve that is controllably positionable anywhere between completely closed (0% open) and completely open (100% open). Adjustment of the position of the restrictor valve 600 is typically accomplished via a source of electrical power that controllably drives an electromechanical mechanism 602 that causes the valve to rotate such as a rotating spool that reacts to a magnetic or electromagnetic field created by the electrical signal output of the controller 16, namely an output of electrical energy, electrical power, voltage, current or amperage the degree or amount of which can be readily and controllably varied by conventional electrical output devices. The electro-mechanism 602 is controllably drivable to cause the valve 600 to open or close to a degree of openness that is proportional to the amount or degree of electrical energy that is input to drive the electro-mechanism. The velocity of upstream withdrawal travel of the pins 1041, 1042 are in turn proportional to the degree of openness of the valve 600. Thus the rate of upstream travel of the pins 1041, 1042 is proportional to the amount or degree of electrical energy that is input to the electro-mechanism 602 drives of valves 600. The electro-mechanism 602 that is selected for driving the valve 600 establishes in the first instance the maximum amount of electrical energy or power (such as voltage or current) that is required to open the valve to its 100% open position. A control for setting the amount or degree of electrical energy or power input to the motor is contained within the controller 16. Controller 16 includes an interface that enables the user to input any selected fraction or percentage of the maximum electrical energy or power needed to adjust the valve 600 to less than 100% open for beginning from the gate closed position of the valve pins 1041, 1042 and their associated actuators 941, 942. Thus the user selects a reduced upstream velocity of the pins 1041, 1042 by inputting to the controller 16 a percentage of the maximum amount of electrical energy or power input (voltage or current) needed to open the valve 600 to 100% open. The user inputs such selections into the controller 16. The user also selects the length of the path of travel RP, RP2 of the valve pin or the position of the valve pin or other component over the course of travel of which the valve 600 is to be maintained partially open and inputs such selections into the controller 16. The controller 16 includes conventional programming or circuitry that receives and executes the user inputs. The controller may include programming or circuitry that enables the user to input as a variable a selected pin velocity rather than a percentage of electrical output, the programming of the controller 16 automatically converting the inputs by the user to appropriate instructions for reduced energy input to the electro-mechanism that drives the valve 600.

Typically the user selects one or more reduced velocities that are less than about 90% of the maximum velocity (namely velocity when the valve 600 is fully open), more typically less than about 75% of the maximum velocity and even more typically less than about 50% of the maximum velocity at which the pins 1041, 1042 are drivable by the hydraulic system. The actual maximum velocity at which the actuators 941, 942 and their associated pins 1041, 1042 are driven is predetermined by selection of the size and configuration of the actuators 941, 942, the size and configuration of the restriction valve 600 and the degree of pressurization and type of hydraulic drive fluid selected for use by the user. The maximum drive rate of the hydraulic system is predetermined by the manufacturer and the user of the system and is typically selected according to the application, size and nature of the mold and the injection molded part to be fabricated.

As shown by the series of examples of programs illustrated in FIGS. 5A-5D one or more reduced pin velocities can be selected and the pin driven by restricted hydraulic fluid flow (or by reduced velocity drive by an electric actuator) between the gate closed (X and Y axis zero position) and the final intermediate upstream open gate position (4 mm for example in the FIG. 5A example, 5 mm in the FIG. 5B example) at which point the controller 16 in response to position sensing instructs the drive system to drive pin 1041, 1042 to travel upstream at a higher, typically maximum, upstream travel velocity (as shown, 100 mm/sec in the FIGS. 5A-5D examples). In the FIG. 5A example, the reduced pin velocity is selected as 50 mm/sec. In practice the actual velocity of the pin may or may not be precisely known, the Y velocity axis corresponding (and generally being proportional) to the degree of electrical energy input to the motor that controls the opening of the flow restriction valve, 100 mm/sec corresponding to the valve 600 being completely 100% open (and pin being driven at maximum velocity); and 50 mm/sec corresponding to 50% electrical energy input to the electromechanism that drives the restriction valve 600 to one-half of its maximum 100% degree of openness. In the FIG. 5A example, the path length RP over which the valve pin 1041, 1042 travels at the reduced 50 mm/sec velocity is 4 mm. After the pin 1041, 1042 has been driven to the upstream position COP position of about 4 mm from the gate closed GC position, the controller 16 instructs the electro-mechanism that drives the valve 600 (typically a magnetic or electromagnetic field driven device such as a spool) to open the restrictor valve 600 to full 100% open at which time the pin (and its associated actuator piston) are driven by the hydraulic system at the maximum travel rate 100 mm/sec for the predetermined, given pressurized hydraulic system.

Figure 5A:
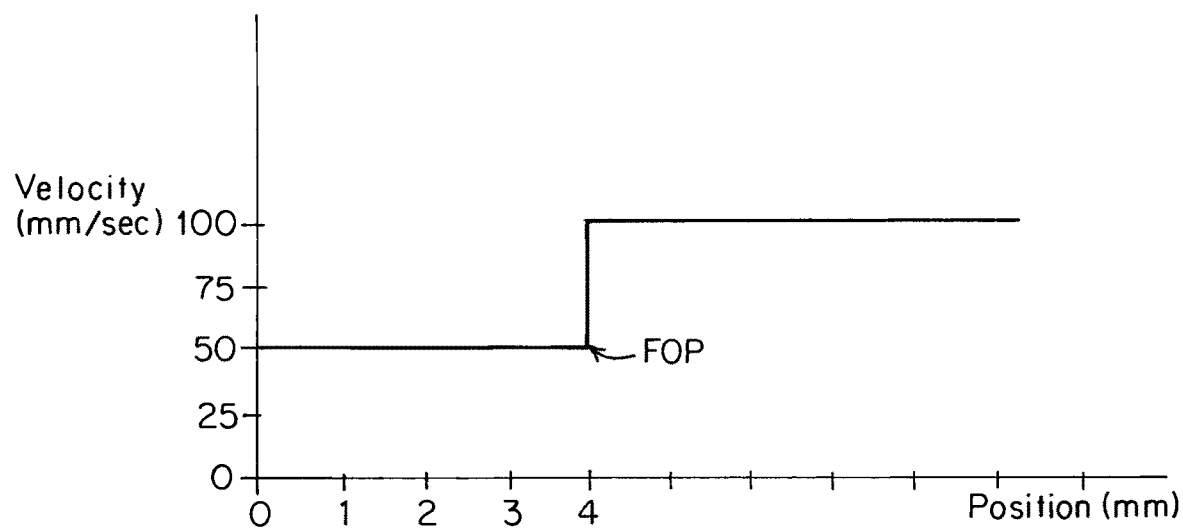
FIGS. 5A-5D are a series of plots of pin velocity versus position each plot representing a different example of the opening of a gate lateral to a central gate via continuous upstream withdrawal of a valve pin at one rate or set of rates over an initial flow path RP and at another higher rate or set of rates of upstream withdrawal of the valve pin beginning at a pin position of FOP and beyond when the fluid material flow is typically at a maximum unrestricted rate of flow through the open gate without any restriction or obstruction from the tip end of the pin.
Figure 5B:
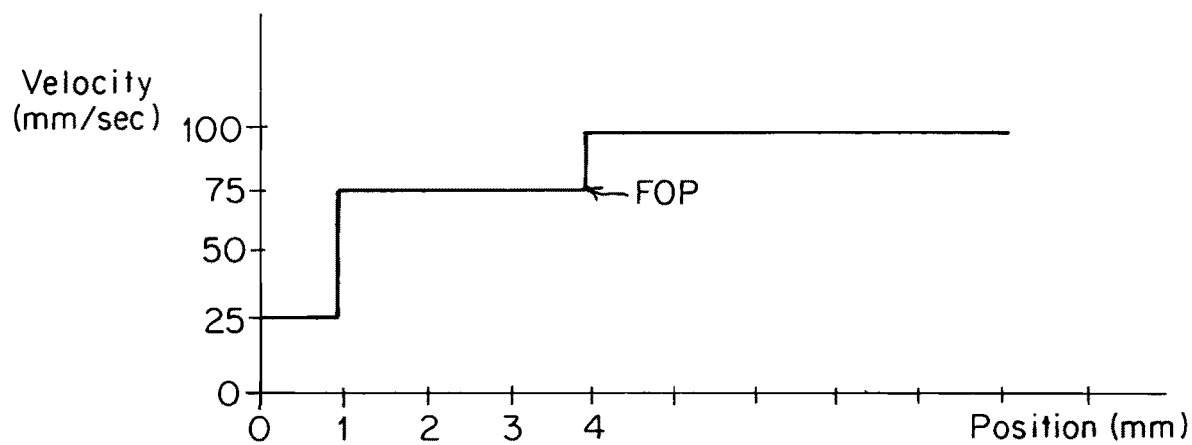
Figure 5C:
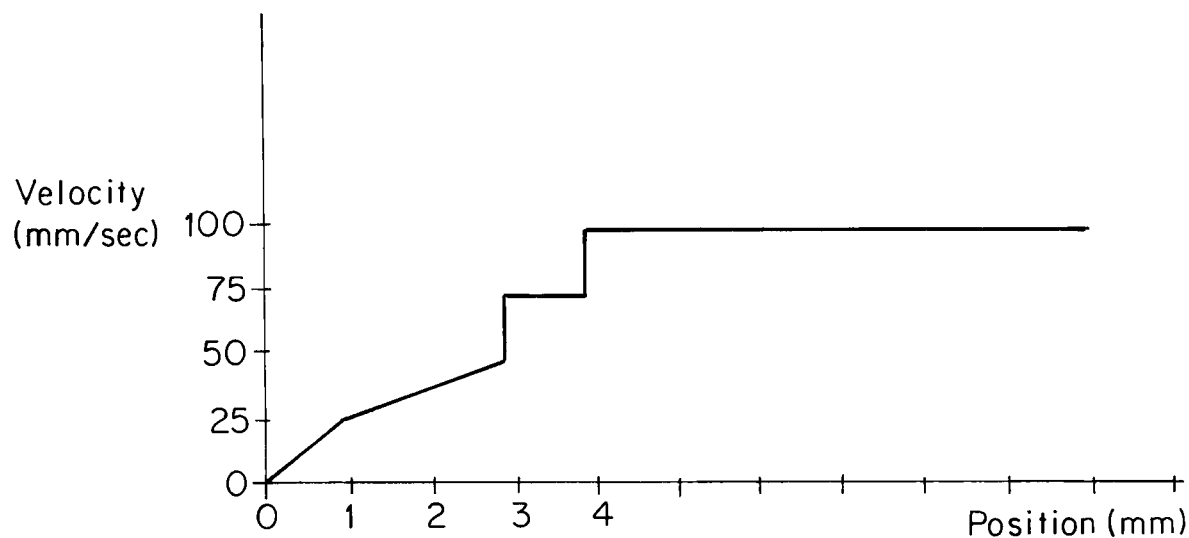
Figure 5D:
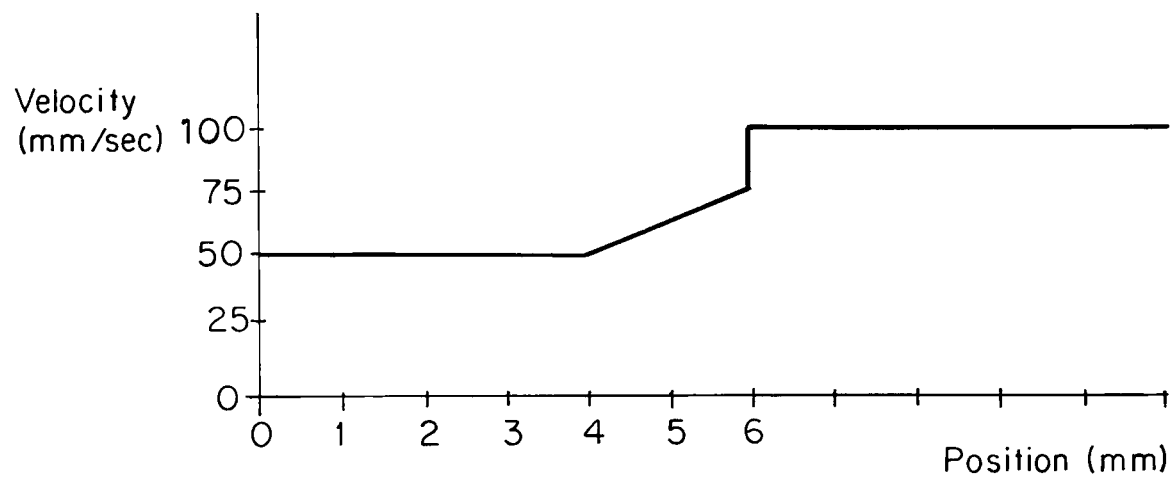

FIGS. 5B-5D illustrate a variety of alternative examples for driving the pin 1041, 1042 at reduced velocities for various durations of time. For example as shown in FIG. 5B, the pin is driven for 0.02 seconds at 25 mm/sec, then for 0.06 seconds at 75 mm/sec and then allowed to go to full valve open velocity shown as 100 mm/sec. Full valve open or maximum velocity is typically determined by the nature of hydraulic (or pneumatic) valve or motor drive system that drives the valve pin. In the case of a hydraulic (or pneumatic) system the maximum velocity that the system is capable of implementing is determined by the nature, design and size of the pumps, the fluid delivery channels, the actuator, the drive fluid (liquid or gas), the restrictor valves and the like.

As shown in FIGS. 5A-5D, when the pin reaches the end of the reduced velocity period, the valve 600 can be instructed to assume the full open position essentially instantaneously or alternatively can be instructed to take a more gradual approach up, between 0.08 and 0.12 seconds, to the maximum valve openness as shown in FIG. 5D. In all cases the controller 16 instructs the valve pin 1041, 1042 to travel continuously upstream rather than follow a profile where the pin might travel in a downstream direction during the course of the injection cycle. Most preferably, the actuator, valve pin, valves and fluid drive system are adapted to move the valve pin between a gate closed position and a maximum upstream travel position that defines an end of stroke position for the actuator and the valve pin. Most preferably the valve pin is moved at the maximum velocity at one or more times or positions over the course of upstream travel of the valve pin past the upstream gate open position. Alternatively to the hydraulic system depicted and described, a pneumatic or gas driven system can be used and implemented in the same manner as described above for a hydraulic system.

Preferably, the valve pin and the gate are configured or adapted to cooperate with each other to restrict and vary the rate of flow of fluid material 1153, FIGS. 3A-3B, 4A-4B over the course of travel of the tip end of the valve pin through the restricted velocity path RP. Most typically as shown in FIGS. 3A, 3B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 4A, 4B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041, 1042 is at a full gate open position, namely when the tip end 1142 of the pin 1041 has travelled to or beyond the length of the restricted flow path RP (which is, for example the 4 mm upstream travel position of FIGS. 5A-5C).

In one embodiment, as the tip end 1142 of the pin 1041 continues to travel upstream from the gate closed GC position (as shown for example in FIGS. 3A, 4A) through the length of the RP path (namely the path travelled for the predetermined amount of time), the rate of material fluid flow 1153 through restriction gap 1154 through the gate 34 into the cavity 30 continues to increase from 0 at gate closed GC position to a maximum flow rate when the tip end 1142 of the pin reaches a position FOP (full open position), FIGS. 5A-5D, where the pin is no longer restricting flow of injection mold material through the gate. In such an embodiment, at the expiration of the predetermined amount of time when the pin tip 1142 reaches the FOP (full open) position FIGS. 5A, 5B, the pin 1041 is immediately driven by the hydraulic system at maximum velocity FOV (full open velocity) typically such that the restriction valve 600 is opened to full 100% open.

In alternative embodiments, when the predetermined time for driving the pin at reduced velocity has expired and the tip 1142 has reached the end of restricted flow path RP2, the tip 1142 may not necessarily be in a position where the fluid flow 1153 is not still being restricted. In such alternative embodiments, the fluid flow 1153 can still be restricted to less than maximum flow when the pin has reached the changeover position COP2 where the pin 1041 is driven at a higher, typically maximum, upstream velocity FOV. In the alternative examples shown in the FIGS. 3B, 4B examples, when the pin has travelled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 3B the maximum fluid flow rate for injection material 1153 is reached at the upstream position COP of the tip end 1142. In another example shown in FIG. 3B 4B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV. In the FIGS. 5A, 5B examples, the upstream FOP position is about 4 mm and 5 mm respectively upstream from the gate closed position. Other alternative upstream FOP positions are shown in FIGS. 5C, 5D.

In another alternative embodiment, shown in FIG. 4B, the pin 1041 can be driven and instructed to be driven at reduced or less than maximum velocity over a longer path length RP3 having an upstream portion UR where the flow of injection fluid mold material is not restricted but flows at a maximum rate through the gate 34 for the given injection mold system. In this FIG. 4B example the velocity or drive rate of the pin 1041 is not changed over until the tip end of the pin 1041 or actuator 941 has reached the changeover position COP3. As in other embodiments, a position sensor senses either that the valve pin 1041 or an associated component has travelled the path length RP3 or reached the end COP3 of the selected path length and the controller receives and processes such information and instructs the drive system to drive the pin 1041 at a higher, typically maximum velocity upstream. In another alternative embodiment, the pin 1041 can be driven at reduced or less than maximum velocity throughout the entirety of the travel path of the pin during an injection cycle from the gate closed position GC up to the end-of-stroke EOS position, the controller 16 being programmed to instruct the drive system for the actuator to be driven at one or more reduced velocities for the time or path length of an entire closed GC to fully open EOS cycle.

In the FIGS. 5A-5D examples, FOV is 100 mm/sec. Typically, when the time period for driving the pin 1041 at reduced velocity has expired and the pin tip 1142 has reached the position COP, COP2, the restriction valve 600 is opened to full 100% open velocity FOV position such that the pins 1041, 1042 are driven at the maximum velocity or rate of travel that the hydraulic system is capable of driving the actuators 941, 942. Alternatively, the pins 1041, 1042 can be driven at a preselected FOV velocity that is less than the maximum velocity at which the pin is capable of being driven when the restriction valve 600 is fully open but is still greater than the selected reduced velocities that the pin is driven over the course of the RP, RP2 path to the COP, COP2 position.

At the expiration of the predetermined reduced velocity drive time, the pins 1041, 1042 are typically driven further upstream past the COP, COP2 position to a maximum end-of-stroke EOS position. The upstream COP, COP2 position is downstream of the maximum upstream end-of-stroke EOS open position of the tip end 1142 of the pin. The length of the path RP or RP2 is typically between about 2 and about 8 mm, more typically between about 2 and about 6 mm and most typically between about 2 and about 4 mm. In practice the maximum upstream (end of stroke) open position EOS of the pin 1041, 1042 ranges from about 8 mm to about 18 inches upstream from the closed gate position GC.

The controller 16 includes a processor, memory, user interface and circuitry and/or instructions that receive and execute the user inputs of percentage of maximum valve open or percentage of maximum voltage or current input to the motor drive for opening and closing the restriction valve, time duration for driving the valve pin at the selected valve openings and reduced velocities.

Figure 6A:
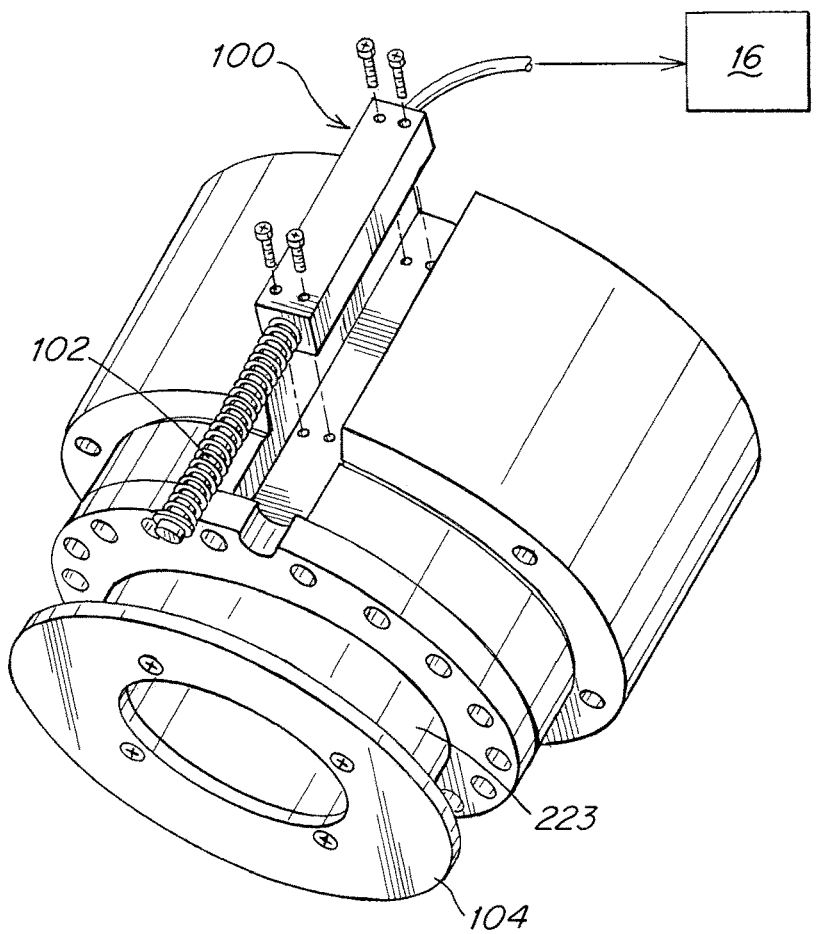
FIGS. 6A-6B show various embodiments of position sensors that can be used in a variety of specific implementations of the invention, the sensors shown in these figures being mounted so as to measure the position of the piston component of the actuator which is indicative of the position of the valve pin relative to the gate.
Figure 6B:
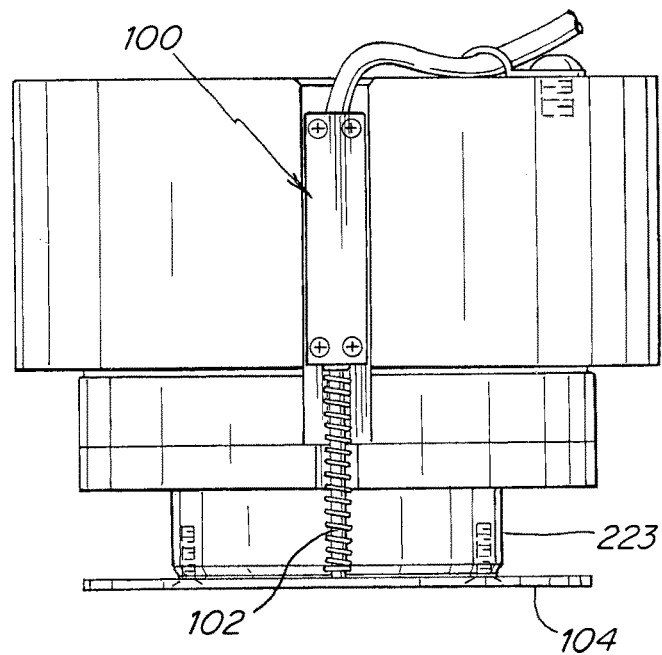
Figure 6C:
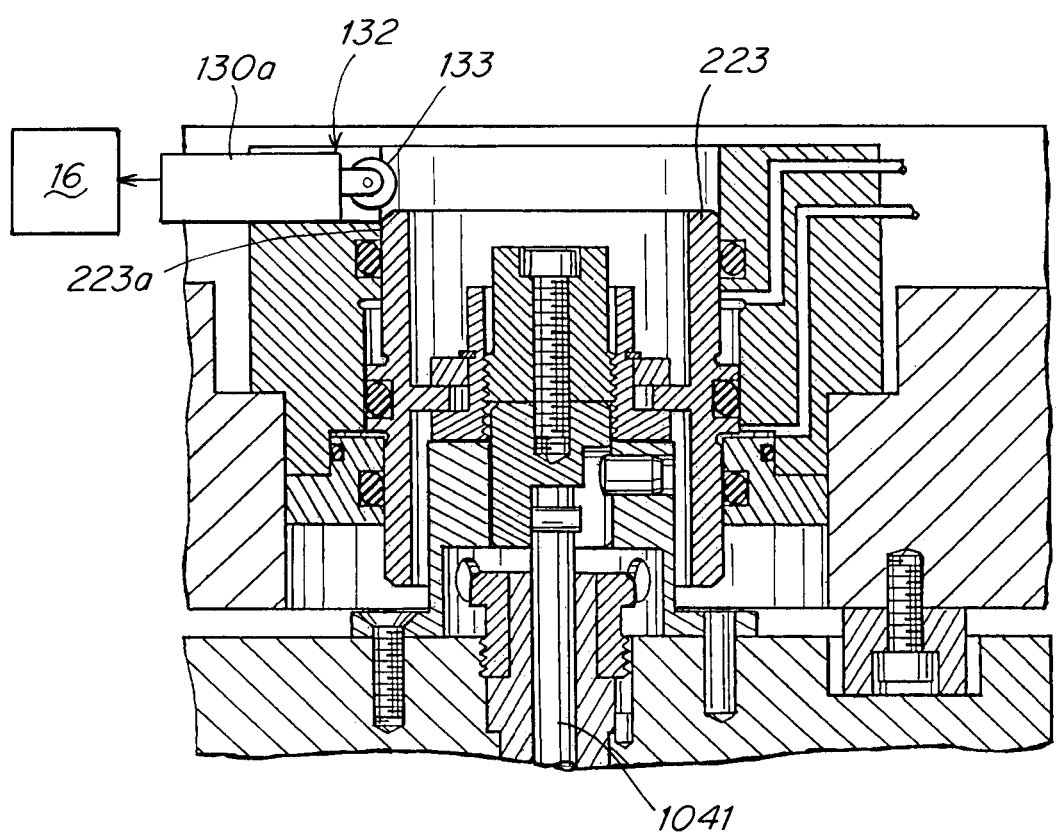
FIGS. 6C-6D show embodiments using limit switches that detect and signal specific positions of the actuator that can be sued to determine velocity, position and switchover to higher openness of valve restrictor and/or upstream velocity of travel of the actuator and valve pin.
Figure 6D:
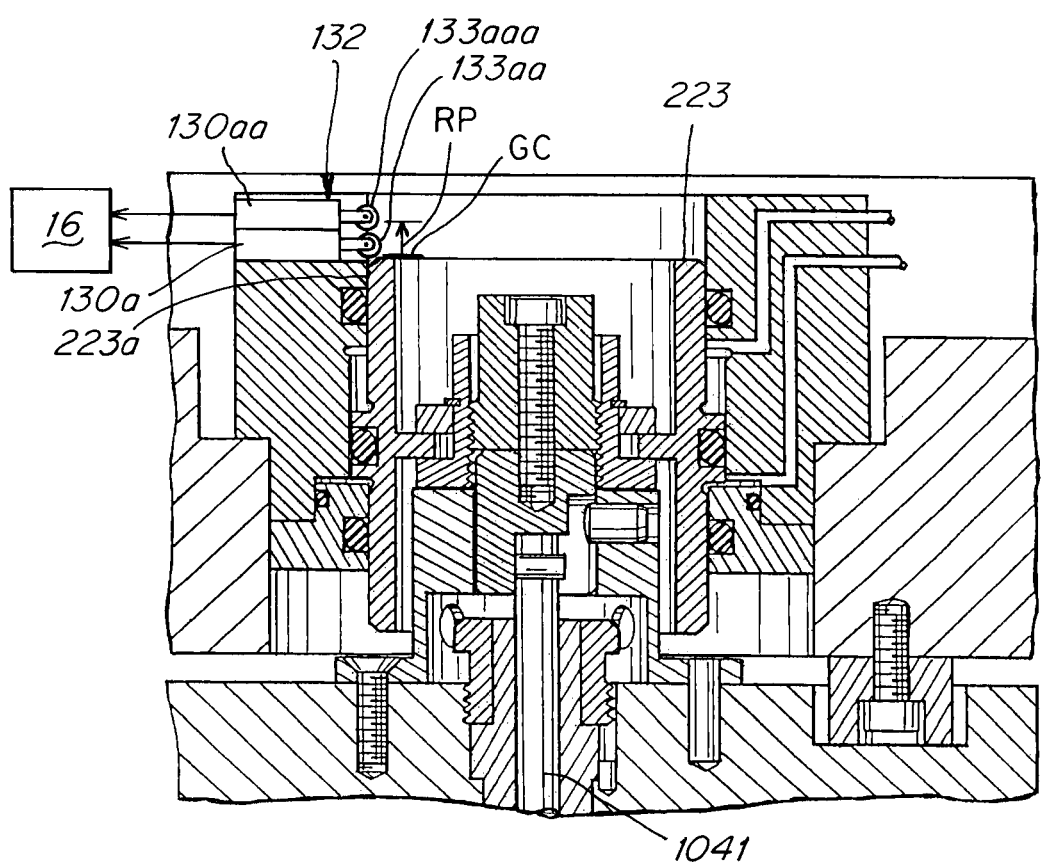

FIGS. 6A-6D show various examples of position sensors 100, 114, 227, 132 the mounting and operation of which are described in U.S. Patent Publication no. 20090061034 the disclosure of which is incorporated herein by reference. As shown the position sensor of FIGS. 6A and 6B for example can track and signal the position of the piston of the actuator piston 223 continuously along its entire path of travel from which data pin velocity can be continuously calculated over the length of RP, RP2, RP3 via spring loaded follower 102 that is in constant engagement with flange 104 during the course of travel of piston 223. Mechanism 100 constantly sends signals to controller 16 in real time to report the position of pin 1041 and its associated actuator. FIGS. 6C, 6D show alternative embodiments using position switches that detect position at specific individual positions of the actuator and its associated valve pin 1041. The FIG. 6C embodiment uses a single trip position switch 130a with trip mechanism 133 that physically engages with the piston surface 223a when the piston 223 reaches the position of the trip mechanism 133. The FIG. 6D embodiment shows the use of two separate position switches 130a, 130aa having sequentially spaced trips 133aa and 133aaa that report the difference in time or distance between each trip engaging surface 223a of the piston, the data from which can be used by controller 16 to calculate velocity of the actuator based on the time of travel of the actuator from tripping one switch 130a and then tripping the next 130aa. In each embodiment the position switch can signal the controller 16 when the valve pin 1041, 1042 has travelled to one or more selected intermediate upstream gate open positions between GC and RP, RP2 or RP3 so that the velocity of the pin can be adjusted to the selected or predetermined velocities determined by the user. As can be readily imagined other position sensor mechanisms can be used such as optical sensors, sensors that mechanically or electronically detect the movement of the valve pin or actuator or the movement of another component of the apparatus that corresponds to movement of the actuator or valve pin.

In alternative embodiments the controller can include a processor and instructions that receive the pin position information and signals from the position sensor and calclulate the real time velocity of the pin from the pin position data in real time at one or more times or positions over the course of the pin travel through the RP, RP2, RP3 path length and/or beyond. Typically such calculations of velocity are continuous throughout the cycle. In such an embodiment, the calculated pin velocity is constantly compared to a predetermined target profile of pin velocities and the velocity of the pin is adjusted in real time by the controller 16 to conform to the profile. In this embodiment as in all previously described embodiments, the pin is moved continuously upstream at all times between the gate closed position and all positions upstream of the gate closed position. Such control systems are described in greater detail in for example U.S. Patent Publication no. 20090061034 the disclosure of which is incorporated herein by reference.

As discussed above, control over the velocity of pin movement in an embodiment where the pin is driven by a hydraulic or pneumatic actuator is typically accomplished by controlling the degree of openness of the fluid restriction valve 600, control over velocity and drive rate or position of valve 600 being the same functions in terms of the instructions, microprocessor design or computer software that carries out instructing and implementing the velocity or drive rate adjustment to the valve pin or actuator. Where the position sensing system senses the position of the pin or other component multiple times throughout the course of the pin or other component movement, and real time velocity can be calculated by the controller 16, a program or instructions can be alternatively used to receive a velocity data input by the user to the controller 16 as the variable to be stored and processed instead of a predetermined voltage or current input Where an actuator that comprises an electric motor is used as the drive mechanism for moving the valve pin 1041, 1042 instead of a fluid driven actuator, the controller 16 can similarly be programmed to receive and process velocity data input as a variable for controlling the velocity or rate of drive of the electric actuator.

What is claimed is:

1. An apparatus for controlling the rate of flow of a fluid material from an injection molding machine to a gate of a mold cavity during an injection molding process, the apparatus comprising:
    an actuator interconnected to a valve pin having a tip end, the actuator moving the valve pin upstream along a path of travel between a downstream gate closed position and one or more intermediate upstream gate open positions, the downstream gate closed position being a position wherein the tip end of the valve pin obstructs the gate to prevent fluid material from flowing into the mold cavity, the one or more intermediate upstream gate open positions being predetermined positions between the downstream gate closed position and an end of stroke position upstream of the intermediate upstream gate open positions, wherein the gate is partially open when the valve pin is in the one or more intermediate upstream gate open positions and the gate is more fully open when the valve pin is in the end of stroke position;
    a position sensor that senses position of the valve pin or the actuator,
    a controller interconnected to the actuator and to the position sensor that controls movement of the actuator at least in part according to instructions that instruct the actuator to drive the valve pin:
        upstream at one or more selected intermediate velocities over the course of travel of the valve pin through the one or more intermediate upstream gate open positions in response to receipt by the controller of a signal from the position sensor that the valve pin is disposed in the one or more intermediate upstream gate open positions,
        upstream at a higher upstream velocity than the one or more selected intermediate velocities between the one or more intermediate upstream gate open positions and the end of stroke position in response to receipt by the controller of a signal from the position sensor that the valve pin is disposed in a selected one of the one or more intermediate upstream gate open positions.

2. The apparatus of claim 1 wherein the tip end of the valve pin and the gate are adapted to cooperate with each other to restrict rate of flow of the fluid material through the gate over the course of the path of travel of the valve pin from the downstream gate closed position to the one or more intermediate upstream gate open positions and provide a restricted flow channel that increases the rate of flow of the fluid material through the gate over the course of at least a portion of the upstream travel of the valve pin from the downstream gate closed position to the one or more intermediate upstream gate open positions.

3. The apparatus of claim 1, wherein the tip end surface of the valve pin comprises a cylindrical or tapered configuration and the gate has a complementary cylindrical or tapered surface that mates with the cylindrical or tapered configuration of the tip end surface to close the gate.

4. The apparatus of claim 1 wherein the one or more selected intermediate velocities are less than about 75% of the higher velocity.

5. The apparatus of claim 1 wherein the controller includes instructions that instruct the actuator to drive the valve pin continuously upstream from the gate closed position to the end of stroke position.

6. The apparatus of claim 1 wherein the length of travel between the downstream gate closed position and the furthest upstream of the one or more intermediate upstream gate open positions is between about 1 mm and about 5 mm.

7. The apparatus of claim 1 wherein in the one of more intermediate upstream positions the tip end of the valve pin restricts the flow of the fluid material to less than a maximum rate of flow into the gate.

8. The apparatus of claim 7 wherein between the one or more intermediate open positions and the end of stroke position, the tip end of the valve pin allows the maximum rate of flow into the gate.

9. The apparatus of claim 1 wherein the actuator comprises an electrically driven motor interconnected to the valve pin and adapted to move the valve pin at a controllably variable rate.

10. A method for controlling the rate of flow of a fluid material from an injection molding machine to a gate of a mold cavity during an injection molding process, the method comprising:

driving, via an actuator interconnected to a valve pin having a tip end, the valve pin upstream along a path of travel between a downstream gate closed position and one or more intermediate upstream gate open positions, the downstream gate closed position being a position wherein the tip end of the valve pin obstructs the gate to prevent fluid material from flowing into the mold cavity, the one or more intermediate upstream gate open positions being predetermined positions between the downstream gate closed position and an end of stroke position upstream of the intermediate upstream gate open positions, wherein the gate is partially open when the valve pin is in the one or more intermediate upstream gate open positions and the gate is more fully open when the valve pin is in the end of stroke position;

sensing, via a position sensor, the position of the valve pin or the actuator at one or more points along the path of travel, controlling, via a controller interconnected to the actuator and to the position sensor, movement of the actuator at least in part according to instructions that instruct the actuator to drive the valve pin:

upstream at one or more selected intermediate velocities over the course of travel of the valve pin through the one or more intermediate upstream gate open positions in response to receipt by the controller of a signal from the position sensor that the valve pin is disposed in the one or more intermediate upstream gate open positions, upstream at a higher upstream velocity than the one or more selected intermediate velocities between the one or more intermediate upstream gate open positions and the end of stroke position in response to receipt by the controller of a signal from the position sensor that the valve pin is disposed in a selected one of the one or more intermediate upstream gate open positions.

11. The method of claim 10 wherein the tip end of the valve pin and the gate are adapted to cooperate with each other to provide a restricted flow channel that increases the rate of flow of the fluid material through the gate over the course of at least a portion of the upstream travel of the valve pin from the downstream gate closed position to the one or more intermediate upstream gate open positions.

12. The method of claim 10 wherein the tip end surface of the valve pin comprises a cylindrical configuration and the gate has a complementary cylindrical surface that mates with the cylindrical configuration of the tip end surface to close the gate.

13. The method of claim 10 wherein the one or more selected intermediate velocities are less than about 75% of the higher velocity.

14. The method of claim 10 wherein the controller includes instructions that instruct the actuator to drive the valve pin continuously upstream from the gate closed position to the end of stroke position.

15. The method of claim 10 wherein the length of travel between the downstream gate closed position and the furthest upstream of the one or more intermediate upstream gate open positions is between about 1 mm and about 5 mm.

16. The method of claim 10 wherein in the one or more intermediate upstream positions the tip end of the valve pin restricts the flow of the fluid material to less than a maximum rate of flow into the gate.

17. The method of claim 16 wherein between the one or more intermediate open positions and the end of stroke position, the tip end of the valve pin allows the maximum rate of flow into the gate.

18. The method of claim 10 wherein the actuator comprises an electrically driven motor interconnected to the valve pin and adapted to move the valve pin at a controllably variable rate.

19. A method of performing an injection molding cycle comprising operating the apparatus of claim 1 to inject the fluid material into the cavity of the mold during the course of an injection molding cycle.

20. An apparatus for controlling the rate of flow of a fluid material from an injection molding machine to a gate of a mold cavity during an injection molding process, the apparatus comprising:

an actuator interconnected to a valve pin having a tip end, the actuator moving the valve pin upstream along a path of travel between a downstream gate closed position and one or more intermediate upstream gate open positions, the downstream gate closed position being a position wherein a tip end surface of the tip end of the valve pin comprises a cylindrical or tapered configuration and the gate has a complementary cylindrical or tapered surface that mates with the cylindrical or tapered configuration of the tip end surface to close the gate, the one or more intermediate upstream gate open positions being predetermined positions between the downstream gate closed position and an end of stroke position upstream of the intermediate upstream gate open positions, wherein the gate is partially open when the valve pin is in the one or more intermediate upstream gate open positions and the gate is more fully open when the valve pin is in the end of stroke position;

a position sensor that senses position of the valve pin or the actuator, a controller interconnected to the actuator and to the position sensor that controls movement of the actuator at least in part according to instructions that instruct the actuator to drive the valve pin:

upstream at one or more selected intermediate velocities over the course of travel of the valve pin through the one or more intermediate upstream gate open positions in response to receipt by the controller of a signal from the position sensor that the valve pin is disposed in the one or more intermediate upstream gate open positions, and upstream at a higher upstream velocity than the one or more selected intermediate velocities between the one or more intermediate upstream gate open positions and the end of stroke position in response to receipt by the controller of a signal from the position sensor that the valve pin is disposed in a selected one of the one or more intermediate upstream gate open positions.

21. The apparatus of claim 20 wherein the instructions instruct the actuator to drive the valve pin upstream beginning from the downstream gate closed position at higher velocity than the one or more selected intermediate velocities.

22. A method for controlling the rate of flow of a fluid material from an injection molding machine to a gate of a mold cavity, the method comprising performing an injection cycle by operating an apparatus according to claim 21.

23. An apparatus (10) for controlling the rate of flow of a fluid material (18, NM) from an injection molding machine to a cavity (30) of a mold, the apparatus comprising:

a manifold (40) receiving the injected fluid material (18, NM, 100b), the manifold having a delivery channel (19) that delivers the fluid material to first and second gates (32, 34) to the mold cavity;

first and second actuators (940, 941) interconnected to first and second valve pins respectively (1040, 1041) having a tip end (1142, 155), the second actuator (941) moving the second valve pin (1041) upstream along a path of travel (RP, RP2) between a downstream gate closed position (GC), one or more intermediate upstream gate open positions (COP, COP2) and an end of stroke position at which the fluid material (18, NM, 100b) flows at a selected maximum rate through the gate, the downstream gate closed position being a position wherein the tip end of the valve pin obstructs the gate (32, 34) to prevent fluid material from flowing into the mold cavity, the one or more intermediate upstream gate open positions (COP, COP2) being predetermined positions between the downstream gate closed position (GC) and the end of stroke position (EOS), a position sensor (951) that senses position of the second valve pin (1041) or the second actuator (941), a controller (16) interconnected to the second actuator (941) and to the position sensor (951) that controls movement of the second actuator at least in part according to instructions that instruct the second actuator (941) to open the second gate (34) after fluid material (100p) injected through the first gate (32) has flowed downstream through the cavity (30) and to drive the second valve pin (1041) upstream at one or more selected intermediate velocities over the course of travel of the second valve pin (1041) through the one or more intermediate upstream gate open positions (COP, COP2) in response to a signal from the position sensor (951) that the second valve pin (1041) is disposed in the one or more intermediate upstream gate open positions and to drive the second valve pin (1041) at a higher velocity than the one or more selected intermediate velocities in response to a signal from the position sensor (951) that the second valve pin is disposed in a predetermined intermediate upstream gate open position (COP, COP2).

24. The apparatus of claim 23 wherein the length of travel between the gate closed position (GC) and one or more selected intermediate upstream gate open positions (COP, COP2) is between about 1 and about 5 mm.

25. The apparatus of claim 23 wherein the actuator comprises an electric motor.

26. The apparatus of claim 24 wherein the controller includes instructions that instruct the actuator to drive the valve pin continuously upstream from the gate closed position to the end of stroke position.

27. An apparatus (10) for controlling the rate of flow of a fluid material (18, NM) from an injection molding machine to a cavity (30) of a mold, the apparatus comprising:

a manifold (40) receiving the injected fluid material (18, NM, 100b), the manifold having a delivery channel (19) that delivers the fluid material to a gate (32, 34, 36) to the mold cavity (30);

an actuator (940, 941, 942) interconnected to a valve pin (1040, 1041) having a tip end (1142, 155), the actuator (940, 941, 942) moving the valve pin (1040, 1041, 1042) upstream along a path of travel (RP, RP2) between a downstream gate closed position (GC), one or more intermediate upstream gate open positions (COP, COP2), and an end of stroke position upstream of the intermediate upstream gate open position at which the fluid (18, NM, 100b) flows at a selected maximum rate through the gate, the downstream gate closed position being a position wherein the tip end of the valve pin obstructs the gate (32, 34) to prevent fluid material from flowing into the mold cavity, the one or more intermediate upstream gate open positions (COP, COP2) being predetermined positions between the downstream gate closed position (GC) and the end of stroke position (EOS) wherein the gate (34) is partially open when the valve pin is in the one or more intermediate upstream gate open positions (COP, COP2);

a position sensor (951) that senses position of the valve pin (1041) or the actuator (941), a controller (16) interconnected to the actuator (940, 941) and to the position sensor (941, 942) that controls movement of the actuator at least in part according to instructions that instruct the actuator (940, 941, 942) to drive the valve pin (1041) upstream at one or more selected intermediate velocities over the course of travel of the valve pin (1041) through the one or more intermediate upstream gate open positions (COP, COP2) in response to receipt of a signal from the position sensor (951) that the valve pin (1041) is disposed in the one or more intermediate upstream gate open positions, wherein the length of travel between the gate closed position (GC) and one or more selected intermediate upstream gate open positions (COP, COP2) is between about 1 and about 5 mm, the valve pin being drivable at a maximum upstream velocity, the one or more selected intermediate velocities being less than the maximum velocity.

28. The apparatus of claim 27 wherein the apparatus comprises: first and second actuators (940, 941) interconnected to first and second valve pins respectively (1040, 1041) having a tip end (1142, 1155) that control delivery of the injection fluid through first and second gates (32, 34) respectively, the second actuator (941) moving the second valve pin (1041) upstream along a path of travel (RP, RP2) between a downstream gate closed position (GC), one or more intermediate upstream gate open positions (COP, COP2) and an end of stroke position at which the fluid material (18, NM, 100b) flows at a selected maximum rate through the gate, the downstream gate closed position being a position wherein the tip end of the valve pin obstructs the gate (32, 34) to prevent fluid material from flowing into the mold cavity, the one or more intermediate upstream gate open positions (COP, COP2) being predetermined positions between the downstream gate closed position (GC) and the end of stroke position (EOS) where the gate (34) is partially open;

a position sensor (951) that senses position of the second valve pin (1041) or the second actuator (941), a controller (16) interconnected to the second actuator (941) and to the position sensor (951) that controls movement of the second actuator at least in part according to instructions that instruct the second actuator (941) to open the second gate (34) after fluid material (100p) injected through the first gate (32) has flowed downstream through the cavity (30) past the second gate (34) and to drive the second valve pin (1041) upstream at one or more selected intermediate velocities over the course of travel of the second valve pin (1041) through the one or more intermediate upstream gate open positions (COP, COP2) in response to receipt by the controller (16) of a signal from the position sensor (951) that the second valve pin (1041) is disposed in the one or more intermediate upstream gate open positions and to drive the second valve pin (1041) at a higher velocity than the one or more selected intermediate velocities in response to receipt of a signal from the position sensor (951) that the second valve pin is disposed in a predetermined intermediate upstream gate open position (COP, COP2).

29. The apparatus of claim 27 wherein the actuator comprises an electric motor.

30. The apparatus of claim 28 wherein the controller includes instructions that instruct the actuator to drive the valve pin continuously upstream from the gate closed position to the end of stroke position.

31. A method of performing an injection molding cycle comprising operating the apparatus of claim 23 to inject the fluid material into the cavity of the mold during the course of an injection molding cycle.

32. A method of performing an injection molding cycle comprising operating the apparatus of claim 27 to inject the fluid material into the cavity of the mold during the course of an injection molding cycle.

33. A method of performing an injection molding cycle comprising operating the apparatus of claim 28 to inject the fluid material into the cavity of the mold during the course of an injection molding cycle.

34. An apparatus (10) for controlling the rate of flow of an injection fluid (18, NM, 100*p*) from an injection molding machine to a cavity (30) of a mold, the apparatus comprising:
a manifold (40) receiving the injected fluid (18, NM, 100*b*), the manifold having a delivery channel (19) that delivers the injection fluid to a gate (32, 34, 36) to the mold cavity (30);
first and second actuators (940, 941) interconnected to first and second valve pins respectively (1040, 1041) having a tip end (1142, 1155) that control delivery of the injection fluid sequentially through first and second gates (32, 34) respectively,
the second actuator (941) moving the second valve pin (1041) upstream along a path of travel (RP, RP2) between a downstream gate closed position (GC), one or more intermediate upstream gate open positions (COP, COP2) and an end of stroke position at which the injection fluid (18, NM, 100*b*) flows at a selected maximum rate through the second gate (34), the downstream gate closed position being a position wherein the tip end of the second valve pin (1041) obstructs the second gate (34) to prevent injection fluid from flowing into the mold cavity, the one or more intermediate upstream gate open positions (COP, COP2) being predetermined positions between the downstream gate closed position (GC) and the end of stroke position (EOS) where the second gate (34) is partially open;
a position sensor (951) that senses position of the second valve pin (1041) or the second actuator (941),
a controller (16) interconnected to the second actuator (941) and to the position sensor (951) that controls movement of the second actuator (941) at least in part according to instructions that instruct the second actuator (941) to open the second gate (34) after the injection fluid (100*p*) injected through the first gate (32) has flowed downstream through the cavity (30) and to drive the second valve pin (1041) upstream at one or more selected intermediate velocities over the course of travel of the second valve pin (1041) through the one or more intermediate upstream gate open positions (COP, COP2) in response to receipt by the controller (16) of a signal from the position sensor (951) that the second valve pin (1041) is disposed in the one or more intermediate upstream gate open positions and to drive the second valve pin (1041) at a higher velocity than the one or more selected intermediate velocities in response to receipt of a signal from the position sensor (951) that the second valve pin is disposed in a predetermined intermediate upstream gate open position (COP, COP2),
the valve pin being drivable at a maximum upstream velocity, the one or more selected intermediate velocities being less than the maximum velocity.

35. The apparatus of claim 34 wherein the instructions instruct the second actuator (941) to open the second gate (34) after the injection fluid (100*p*) injected through the first gate (32) has flowed downstream through the cavity (30) past the second gate (34).

36. The apparatus of claim 34 wherein the length of travel between the gate closed position (GC) and the intermediate upstream gate open position (COP, COP2) is between about 1 and about 5 mm.

37. The apparatus of claim 34 wherein the second actuator (941) comprises an electric motor.

38. The apparatus of claim 37 wherein the position sensor senses position of the second actuator (941).

39. The apparatus of claim 34 wherein the one or more selected intermediate velocities are less than about 75% of the higher velocity.

40. A method of performing an injection molding cycle comprising operating the apparatus of claim 34 to inject the fluid material into the cavity of the mold during the course of an injection molding cycle.

41. A method of performing an injection molding cycle comprising operating the apparatus of claim 35 to inject the fluid material into the cavity of the mold during the course of an injection molding cycle.

42. A method of performing an injection molding cycle comprising operating the apparatus of claim 36 to inject the fluid material into the cavity of the mold during the course of an injection molding cycle.

43. A method of performing an injection molding cycle comprising operating the apparatus of claim 37 to inject the fluid material into the cavity of the mold during the course of an injection molding cycle.

44. A method of performing an injection molding cycle comprising operating the apparatus of claim 38 to inject the fluid material into the cavity of the mold during the course of an injection molding cycle.

45. A method of performing an injection molding cycle comprising operating the apparatus of claim 39 to inject the fluid material into the cavity of the mold during the course of an injection molding cycle.

46. An apparatus for controlling the rate of flow of a fluid material from an injection molding machine to a gate of a mold cavity during an injection molding process, the apparatus comprising:
an actuator interconnected to a valve pin having a tip end, the actuator moving the valve pin upstream along a path of travel between a downstream gate closed position and one or more intermediate upstream gate open positions, the downstream gate closed position being a position wherein the tip end of the valve pin obstructs the gate to prevent fluid material from flowing into the mold cavity, the one or more intermediate upstream gate open positions being predetermined positions between the downstream gate closed position and an end of stroke position upstream of the intermediate upstream gate open positions, wherein the gate is partially open when the valve pin is in the one or more intermediate upstream gate open positions and the gate is fully open when the valve pin is in the end of stroke position;

a position sensor that senses position of the valve pin or the actuator, a controller interconnected to the actuator and to the position sensor that controls movement of the actuator at least in part according to instructions that instruct the actuator to drive the valve pin:

upstream at one or more selected intermediate velocities over the course of travel of the valve pin through the one or more intermediate upstream gate open positions in response to receipt by the controller of a signal from the position sensor that the valve pin is disposed in the one or more intermediate upstream gate open positions, upstream at a higher upstream velocity than the one or more selected intermediate velocities between the one or more intermediate upstream gate open positions and the end of stroke position, wherein the tip end of the valve pin and the gate are adapted to cooperate with each other to restrict rate of flow of the fluid material through the gate over the course of the path of travel of the valve pin from the downstream gate closed position to the one or more intermediate upstream gate open positions, and wherein the valve pin is withdrawn at a reduced velocity over more than about 50% of the path of travel of the valve pin from the downstream gate closed position to the one or more intermediate upstream gate open positions.

47. The apparatus of claim 46 wherein the path of travel of the valve pin from the downstream gate closed position to the one or more intermediate upstream gate open positions is between about 1 and about 8 mm.

48. The apparatus of claim 47 wherein the path of travel of the valve pin from the downstream gate closed position to the one or more intermediate upstream gate open positions is between about 1 and about 5 mm.

49. The apparatus of claim 46 wherein the one or more selected intermediate velocities are less than about 75% of the higher velocity.

50. The apparatus of claim 47 wherein the one or more selected intermediate velocities are less than about 75% of the higher velocity.

51. Method of performing an injection molding cycle comprising operating an apparatus according to claim 46.

52. An apparatus for controlling the rate of flow of a fluid material from an injection molding machine to a gate of a mold cavity during an injection molding process, the apparatus comprising:

an actuator interconnected to a valve pin having a tip end, the actuator moving the valve pin upstream along a path of travel between a downstream gate closed position and one or more intermediate upstream gate open positions, the downstream gate closed position being a position wherein the tip end of the valve pin obstructs the gate to prevent fluid material from flowing into the mold cavity, the one or more intermediate upstream gate open positions being predetermined positions between the downstream gate closed position and an end of stroke position upstream of the intermediate upstream gate open positions, wherein the gate is partially open when the valve pin is in the one or more intermediate upstream gate open positions and the gate is fully open when the valve pin is in the end of stroke position;

a position sensor that senses position of the valve pin or the actuator, a controller interconnected to the actuator and to the position sensor that controls movement of the actuator at least in part according to instructions that instruct the actuator to drive the valve pin:

upstream at one or more selected intermediate velocities over the course of travel of the valve pin through the one or more intermediate upstream gate open positions in response to receipt by the controller of a signal from the position sensor that the valve pin is disposed in the one or more intermediate upstream gate open positions, upstream at a higher upstream velocity than the one or more selected intermediate velocities between the one or more intermediate upstream gate open positions and the end of stroke position, wherein the path of travel of the valve pin from the downstream gate closed position to the one or more intermediate upstream gate open positions is between about 1 and about 8 mm.

53. Apparatus according to claim 52 wherein the tip end of the valve pin and the gate are adapted to cooperate with each other to restrict rate of flow of the fluid material through the gate over the course of the path of travel of the valve pin from the downstream gate closed position to the one or more intermediate upstream gate open positions, and wherein the valve pin is withdrawn at a reduced velocity over more than about 50% of the path of travel of the valve pin from the downstream gate closed position to the one or more intermediate upstream gate open positions.

54. Apparatus of claim 52 wherein the one or more selected intermediate velocities are less than about 75% of the higher velocity.

55. Method of performing an injection molding cycle comprising operating an apparatus according to claim 52.

56. Apparatus of claim 20 wherein the controller includes instructions that instruct the actuator to drive the valve pin continuously upstream from the gate closed position to the end of stroke position.

57. Apparatus of claim 23 wherein the controller includes instructions that instruct the actuator to drive the valve pin continuously upstream from the gate closed position to the end of stroke position.

58. Method of claim 26 wherein the controller includes instructions that instruct the actuator to drive the valve pin continuously upstream from the gate closed position to the end of stroke position.

59. Apparatus of claim 27 wherein the controller includes instructions that instruct the actuator to drive the valve pin continuously upstream from the gate closed position to the end of stroke position.

60. Method of claim 33 wherein the controller includes instructions that instruct the actuator to drive the valve pin continuously upstream from the gate closed position to the end of stroke position.

61. Apparatus of claim 34 wherein the controller includes instructions that instruct the actuator to drive the valve pin continuously upstream from the gate closed position to the end of stroke position.

62. Method of claim 40 wherein the controller includes instructions that instruct the actuator to drive the valve pin continuously upstream from the gate closed position to the end of stroke position.

63. Apparatus of claim 46 wherein the controller includes instructions that instruct the actuator to drive the valve pin continuously upstream from the gate closed position to the end of stroke position.

64. Method of claim 51 wherein the controller includes instructions that instruct the actuator to drive the valve pin continuously upstream from the gate closed position to the end of stroke position.

65. Apparatus of claim 52 wherein the controller includes instructions that instruct the actuator to drive the valve pin continuously upstream from the gate closed position to the end of stroke position.

66. Method of claim 55 wherein the controller includes instructions that instruct the actuator to drive the valve pin continuously upstream from the gate closed position to the end of stroke position.

67. An apparatus for controlling the rate of flow of a fluid material from an injection molding machine downstream through a nozzle leading to a gate of a mold cavity during an injection molding process, the apparatus comprising:
  an actuator interconnected to a valve pin having a tip end, the actuator moving the valve pin upstream along a path of travel between a downstream gate closed position and one or more intermediate upstream gate open positions, the downstream gate closed position being a position wherein a tip end surface of the tip end of the valve pin comprises a cylindrical or tapered configuration and the gate has a complementary cylindrical or tapered surface that mates with the cylindrical or tapered configuration of the tip end surface to close the gate into a gate closed position,
  the one or more intermediate upstream gate open positions being predetermined positions between the downstream gate closed position and an end of stroke position upstream of the intermediate upstream gate open positions, wherein a flow restriction gap is formed between outer surfaces of the valve pin and inner surfaces of the nozzle such that flow of fluid material is restricted when the valve pin is in the one or more intermediate upstream gate open positions;
  a position sensor that senses position of the valve pin or the actuator,
  a controller interconnected to the actuator and to the position sensor that controls movement of the actuator at least in part according to instructions that instruct the actuator to drive the valve pin:
    upstream at one or more selected intermediate velocities over the course of travel of the valve pin through the one or more intermediate upstream gate open positions in response to receipt by the controller of a signal from the position sensor that the valve pin is disposed in the one or more intermediate upstream gate open positions, and
    upstream at a higher upstream velocity than the one or more selected intermediate velocities between the one or more intermediate upstream gate open positions and the end of stroke position in response to receipt by the controller of a signal from the position sensor that the valve pin is disposed in a selected one of the one or more intermediate upstream gate open positions.

68. Apparatus of claim 67, wherein flow of fluid material is at a maximum rate when the valve pin is in the end of stroke position.

69. Apparatus of claim 67 wherein the one or more selected intermediate velocities are less than about 75% of the higher velocity.

70. Apparatus of claim 67 wherein the controller includes instructions that instruct the actuator to drive the valve pin continuously upstream from the gate closed position to the end of stroke position.

71. Apparatus of claim 67 wherein the length of travel between the downstream gate closed position and the furthest upstream of the one or more intermediate upstream gate open positions is between about 1 mm and about 8 mm.

72. Apparatus of claim 67 wherein between the one or more intermediate open positions and the end of stroke position, the tip end of the valve pin allows a maximum rate of flow into the gate.

73. Apparatus of claim 67 wherein the actuator comprises an electrically driven motor interconnected to the valve pin and adapted to move the valve pin at a controllably variable rate.

74. Apparatus of claim 67 wherein the instructions instruct the actuator to drive the valve pin upstream beginning from the downstream gate closed position at higher velocity than the one or more selected intermediate velocities.

75. A method for controlling the rate of flow of a fluid material from an injection molding machine to a gate of a mold cavity, the method comprising performing an injection cycle by operating an apparatus according to claim 67.

76. Method of claim 75 wherein the controller includes instructions that instruct the actuator to drive the valve pin continuously upstream from the gate closed position to the end of stroke position.

* * * * *